United States Patent
Nadathur et al.

(10) Patent No.: US 10,985,937 B2
(45) Date of Patent: Apr. 20, 2021

(54) DELEGATION OR REVOCATION OF TRIGGER EXECUTION IN AN AUTOMATED ENVIRONMENT

(71) Applicant: Apple Inc., Cupertino, CA (US)

(72) Inventors: Anush G. Nadathur, San Jose, CA (US); Kevin P. McLaughlin, Waikoloa, HI (US); Nathan E. Carroll, San Francisco, CA (US)

(73) Assignee: Apple Inc., Cupertino, CA (US)

(*) Notice: Subject to any disclaimer, the term of this patent is extended or adjusted under 35 U.S.C. 154(b) by 435 days.

(21) Appl. No.: 15/180,046

(22) Filed: Jun. 12, 2016

(65) Prior Publication Data

US 2017/0033944 A1 Feb. 2, 2017

Related U.S. Application Data

(60) Provisional application No. 62/199,892, filed on Jul. 31, 2015.

(51) Int. Cl.
*H04L 12/28* (2006.01)
*H04L 12/24* (2006.01)
(Continued)

(52) U.S. Cl.
CPC ........ *H04L 12/2816* (2013.01); *H04L 12/283* (2013.01); *H04L 12/2814* (2013.01);
(Continued)

(58) Field of Classification Search
CPC ............. H04L 12/2814; H04L 12/2816; H04L 12/282; H04L 12/283; H04L 41/0654;
(Continued)

(56) References Cited

U.S. PATENT DOCUMENTS 6,658,453 B1 * 12/2003 Dattatri ............... G06F 11/3495
709/202
7,945,675 B2 5/2011 Skomra
(Continued)

FOREIGN PATENT DOCUMENTS

CN 104460330 A 3/2015
CN 104653026 A 5/2015
(Continued)

OTHER PUBLICATIONS

The International Search Report and the Written Opinion dated Oct. 21, 2016 in International Application No. PCT/US2016/044118. 12 pages.

(Continued)

*Primary Examiner* — Lance Leonard Barry
(74) *Attorney, Agent, or Firm* — Kilpatrick, Townsend & Stockton

(57) ABSTRACT

A triggered action set for a first device can be defined by the first device. Instructions for executing the triggered action set can be provided by the first device to a second device. Subsequent to providing the instructions, the first device can monitor the status of the second device; if the delegate device enters a state in which it is presumed to be unavailable to execute the trigger, the first device can monitor for a triggering event associated with the triggered action set and send a control message to an accessory device in response to detecting the triggering event.

19 Claims, 13 Drawing Sheets

(51) Int. Cl.
*H04L 29/08* (2006.01)
*H04L 29/14* (2006.01)

(52) U.S. Cl.
CPC ...... *H04L 41/0681* (2013.01); *H04L 41/0695* (2013.01); *H04L 41/0816* (2013.01); *H04L 67/125* (2013.01); *H04L 67/2861* (2013.01); *H04L 69/40* (2013.01)

(58) Field of Classification Search
CPC ............. H04L 41/0681; H04L 41/0695; H04L 41/0816; H04L 67/00; G05B 19/042; G05B 2219/2642
See application file for complete search history.

(56) References Cited

U.S. PATENT DOCUMENTS

| | | | |
|---|---|---|---|
| 10,419,890 B2* | 9/2019 | Edge | H04L 67/18 |
| 2006/0116207 A1* | 6/2006 | DeLeon | G07F 17/3234 463/42 |
| 2007/0296547 A1 | 12/2007 | Pellarin et al. | |
| 2009/0257403 A1 | 10/2009 | Jeon et al. | |
| 2011/0131645 A1* | 6/2011 | Johnson | G06F 11/0709 726/12 |
| 2012/0158161 A1* | 6/2012 | Cohn | G08B 29/02 700/90 |
| 2012/0297306 A1* | 11/2012 | Hassan | H04W 76/14 715/735 |
| 2013/0069541 A1 | 3/2013 | Feri et al. | |
| 2013/0279478 A1* | 10/2013 | De Bruin | H04W 36/0085 370/331 |
| 2013/0285556 A1 | 10/2013 | Challapali et al. | |
| 2014/0128994 A1 | 5/2014 | Hallman et al. | |
| 2014/0143785 A1 | 5/2014 | Mistry et al. | |
| 2014/0162693 A1* | 6/2014 | Wachter | H04W 4/021 455/456.3 |
| 2015/0195349 A1* | 7/2015 | Cardamore | H04W 4/70 709/201 |
| 2015/0308178 A1* | 10/2015 | Warren | E05F 15/70 700/275 |
| 2016/0164748 A1 | 6/2016 | Kim | |

FOREIGN PATENT DOCUMENTS

| | | |
|---|---|---|
| CN | 106462123 A | 2/2017 |
| FR | 2902916 A1 | 12/2007 |

OTHER PUBLICATIONS

Condliffe, Jamie—"Android Lollipop Trusted Places: Never Unlock Your Phone at Home Again." GIZMODO, The new 718 Boxster. Downloaded on Nov. 19, 2014 from: http://www.androidpolice.com/2014/11/18lgoogle-play-services-update-adds-trusted-places-feature-to-lollipops-smart-lock/. 3 pages.

Khan, Aatif—"ActIf: Add Conditional (IF) Actions to Activator on Jailbroken iPhone/iPad [Cydia]." Apr. 29, 2014. Downloaded Sep. 6, 2016 from: http://www.addictivetips.com/los/actif-add-conditional-if-actions-to-activator-on-jailbroken-iphone/. 5 pages.

"Communication Pursuant to Article 94(3) EPC" dated Feb. 28, 2019 in European Patent Application No. 16 748 234.8-1221. 8 pages.

Wikipedia, "Redundancy (engineering)." Mar. 7, 2019. 4 pages.

"Communication pursuant to Article 94(3) EPC," dated Aug. 25, 2020 in European Patent Application No. 16 748 234.8-1203. 8 pages.

"First Office Action," mailed Feb. 25, 2021 in Chinese Application No. 201680043833.3. 15 pp.. Includes English summary of new references cited only.

* cited by examiner

| NAME | TRIGGERING EVENT | TRIGGERING CONDITION | ACTIONS |
|---|---|---|---|
| Coming Home | Geofence entered | After sunset | • Foyer light on<br>• Thermostat to 72° |
| Movie Watching | Manual | Always | • Kitchen light off<br>• Family room light dim<br>• TV on<br>• TV accesses movie list |
| Sleep | 10:00 pm | Weeknight | • Downstairs lights off<br>• Lights off in children's bedrooms<br>• Family room TV off<br>• Dim lights in master bedroom<br>• Master bedroom play bedtime music |

FIG. 4

DELEGATION OR REVOCATION OF TRIGGER EXECUTION IN AN AUTOMATED ENVIRONMENT

CROSS-REFERENCES TO RELATED APPLICATIONS

This application claims the benefit of U.S. Provisional Application No. 62/199,892, filed Jul. 31, 2015, the disclosure of which is incorporated herein by reference.

This disclosure is related to the following U.S. patent applications: application Ser. No. 14/614,914, filed Feb. 5, 2015 (now U.S. Pat. No. 9,979,625); application Ser. No. 14/725,891 (now U.S. Pat. No. 10,177,933), filed May 29, 2015; and application Ser. No. 14/725,912 (now U.S. Pat. No. 10,454,783), filed May 29, 2015. The disclosures of these applications are incorporated by reference herein in their entirety.

BACKGROUND

The present disclosure relates generally to automated environments and in particular to delegation of executing triggered action sets in such an environment.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, household appliances, etc. Users want to control these devices easily and conveniently using mobile devices and the like and to automate their operation.

SUMMARY

At present, it can be difficult for a user to manage multiple electronically controllable devices or systems. For instance, a user's home might have a thermostat, an electronically controllable lighting system, a home security system, and so on. Each such system can be made by a different manufacturer, and each manufacturer may provide a dedicated controller device (e.g., IR-based remote control device) or a controller application program (or "app") that the user can install and run on a general-purpose device such as a smart phone, tablet, or home computer system. Each controller device or controller app is typically customized for a particular manufacturer's systems and may not be interoperable with systems from other manufacturers or even with other systems from the same manufacturer. Such a piecemeal approach is not readily scalable. A user seeking to create a "smart home" environment or the like, with an array of disparate devices that can be centrally controlled or managed, is confronted with the need to accumulate a plethora of controller devices and/or controller apps.

Certain aspects of the present invention can operate in the context of protocols for communication between a controller device (or "controller") and any number of other electronic devices that are to be controlled (referred to herein as "accessory devices" or simply "accessories"). A controller can be implemented, for example, on a general-purpose computing device such as a desktop computer, laptop computer, tablet computer, smart phone, other mobile phone, or other handheld or wearable computing device, by providing the general-purpose computing device with appropriate executable program code; alternatively, a controller can be a special-purpose computing device. An accessory can include any device that is controllable by a controller. Examples of accessories include light fixtures, thermostats, door locks, automatic door openers (e.g., garage door opener), still or video cameras, and so on. Accessories and controllers can communicate with each other via wired or wireless channels using standard transport protocols such as Wi-Fi, Bluetooth, Bluetooth LE, or the like. It is to be understood that other communication protocols and transports can be used.

In some embodiments, a "uniform" accessory protocol can be provided via which controllers can send command-and-control messages to the accessory and receive responses from the accessory in a uniform format, regardless of the type or functionality of the accessory. For instance, an accessory can be defined as a collection of services, with each service being defined as a set of characteristics, each of which has a defined value at any given time. These characteristics can represent various aspects of the accessory's state. The protocol can define message formats via which a controller can interrogate (e.g., by reading) and update (e.g., by writing) characteristics of an accessory (singly or in groups), thereby allowing the controller to determine and/or change the accessory's state. Accordingly, any type of accessory, regardless of function, can be controlled in a consistent manner.

In some embodiments, the protocol can define security measures that can be used to prevent unauthorized controllers from operating an accessory. For example, an accessory can be configured to accept requests only from a controller that has previously established a pairing with the accessory and is therefore recognized by the accessory. The protocol can specify the pairing procedures so as to minimize risk of a pairing occurring without approval of the accessory's rightful owner/operator. Further, the protocol can specify end-to-end message encryption such that only the particular controller and accessory can decrypt messages exchanged between them.

A user may desire to automate certain actions of accessories so that the actions are performed automatically in response to the occurrence of a particular event or condition, such as turning on certain lights when the user arrives home or turning off appliances at bedtime. In some embodiments, automation of accessory actions can be achieved by defining triggered action sets (also referred to herein as "triggers"). A triggered action set can be defined, e.g., by specifying to a controller a triggering event (which can be any event that can be detected by a controller) and one or more resulting actions (including one or more operations on accessory devices in the automated environment) to be performed when the controller detects the triggering event. A triggered action set can be executed by a controller, e.g., by detecting occurrence of the triggering event and, in response to detecting the occurrence of the triggering event, sending command-and-control messages to accessories to perform the one or more resulting actions. In some embodiments, the definition of a trigger can also include one or more triggering conditions; when occurrence of the triggering event is detected, the controller can determine whether the triggering condition is satisfied or not, and sending of command-and-control messages to accessories to perform the one or more resulting actions can be made contingent on the triggering condition being satisfied.

Certain embodiments of the present invention relate to delegating the execution of a triggered action set by one controller device (also referred to as an "owning device") to another controller device. In some embodiments, the owning device can be a mobile device operated by a user, such as a smart phone or tablet, on which the user defines a triggered action set. The owning device can communicate with another controller device (a "delegate"), which can be, e.g., a coordinator device that is resident in the automated environment and capable of coordinating operations initiated from multiple controller devices. For example, the owning device can send a delegation message to the delegate, where the delegation message can include a definition of the trigger (e.g., the triggering event and the resulting action(s) to be performed). As another example, the owning device can update a trigger data object defining the trigger to indicate the delegation status; the trigger data object can be part of an environment model that is shared (e.g., via local or cloud-based synchronization) among all controllers associated with a particular automated environment, and the delegate can receive the updated trigger data object through an automated synchronization operation. Regardless of the particular mechanism of delegation, the delegate can assume responsibility for executing the trigger (i.e., detecting the triggering event and performing the resulting actions) without further communication from the owning device. In some embodiments, the owning device can also instruct a delegate to enable or disable a delegated trigger.

It is possible that in some instances a delegate may become unavailable. For example, the delegate might go offline or be logged out from a user account that has authorization to communicate with the accessories. In some embodiments, the owning device of the trigger (or some other designated "fallback" controller) can monitor the status of the delegate; if the delegate becomes "unavailable," the controller that is monitoring the delegate's status can resume the responsibility for executing the trigger.

In some embodiments, a coordinator device (or other delegate) can receive multiple delegated triggers, including triggers owned by different controllers. Where a coordinator receives multiple delegated triggers, the coordinator can perform consistency checking operations to detect conflicts between different triggering events and actions. For example, two triggers may specify incompatible actions in response to the same triggering event (e.g., one trigger may specify turning a particular light on while another specifies turning the light off). Another example of a conflict can be a "loop" in which a resulting action for one trigger is the triggering event for another and vice versa. (Longer loops are also possible.) A coordinator can detect conflicts, e.g., by comparing the triggering event and resulting actions of different triggers, and can alert one or more users to the conflict in order to facilitate resolution. A coordinator can also disable execution of one or more of the conflicting triggers until such time as the conflict is resolved (e.g., by the user modifying the definition of at least one of the triggers). In some embodiments, a coordinator or other controller may be able to resolve some types of conflicts automatically and/or to merge triggers that overlap but do not conflict.

In some embodiments, an automated environment can include multiple coordinators that can communicate with each other to optimize operations. For example, each controller may be assigned to a specific coordinator and may send delegation messages to its assigned coordinator. However, the assigned coordinator may not be the most effective device to detect a triggering event or execute a resulting action. For instance, if the assigned coordinator is located in a downstairs room in a home, and the resulting action includes turning on a light in an upstairs room, a coordinator in an upstairs room may be better able to execute the action. Accordingly, in some embodiments, a coordinator (or any other controller) that becomes the delegate for a particular trigger can re-delegate the trigger to a second coordinator (or other controller). Such re-delegation can be performed transparently to the user.

The following detailed description together with the accompanying drawings will provide a better understanding of the nature and advantages of the present invention.

BRIEF DESCRIPTION OF THE DRAWINGS

FIG. 4 shows a table listing examples of triggered action sets that can be defined according to an embodiment of the present invention.

DETAILED DESCRIPTION

Example Environment

Figure 1:
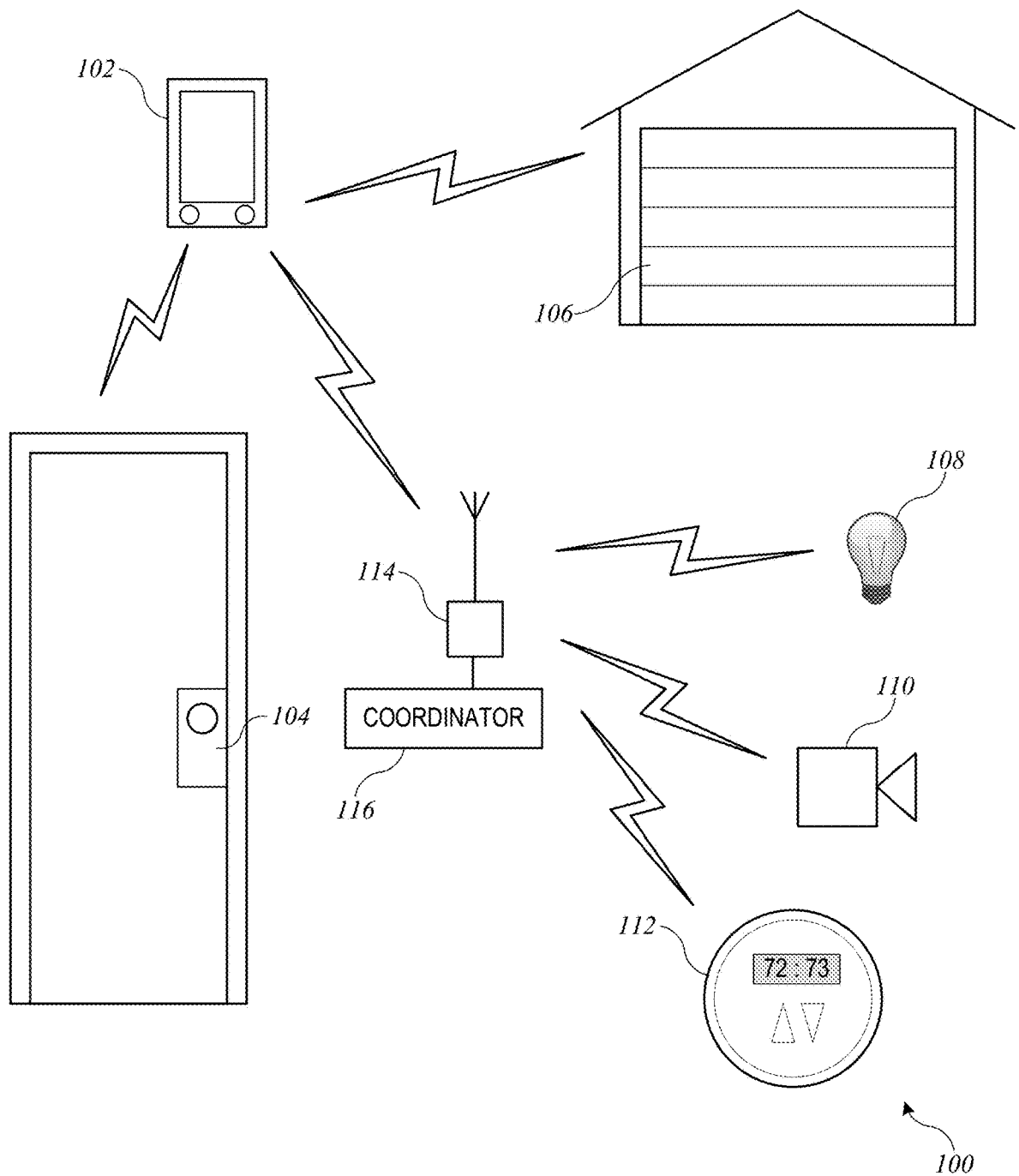
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). Another type of intermediary can be coordinator 116, which, in addition to operating as a controller, can relay messages between other controllers and accessories. In some embodiments, coordinator 116 can also implement various control logic to automate or optimize interactions with accessories; examples are described below.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. As another example, coordinator 116 can be connected to access point 114 by a wired connection as shown (this connection can be wireless if desired), and controller 102 can communicate with accessories such as light bulb 108 by sending messages to coordinator 116 via access point 114; coordinator 116 can communicate with light bulb 108, either via access point 114 or via another channel such as a Bluetooth LE channel. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions or privileges can be configured and controlled, for example, using techniques described below, and in above-referenced U.S. application Ser. No. 14/725,891.

In some embodiments, a uniform accessory protocol can facilitate communication by a controller 102 with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. Examples of an accessory model based on services and characteristics are described in above-referenced U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. Examples of message formats are described in above-referenced U.S. application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914.

In some embodiments, controllers (or their users) can be assigned various permissions or privileges in regard to the accessories. For example, an administrator (or "admin") privilege may be a highest level of privilege, and a controller with admin privileges may establish pairings with accessories and control any controllable characteristic of the accessory state. In some embodiments, admin privilege may be granted to the first controller to perform pair setup with a particular accessory, and after the admin controller performs pair setup, the accessory can decline to perform pair setup with any other controllers; instead, the admin controller can grant access to other controllers (or other users) by performing pair add. In some embodiments, the admin controller can specify privileges for each added controller (including admin privileges).

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive notifications of updates to) the service and/or its characteristics. Accordingly, protocols and communication processes used in embodiments of the invention can be uniformly applied in any context with one or more controllers and one or more accessories, regardless of accessory function or controller form factor or specific interfaces.

Figure 2:
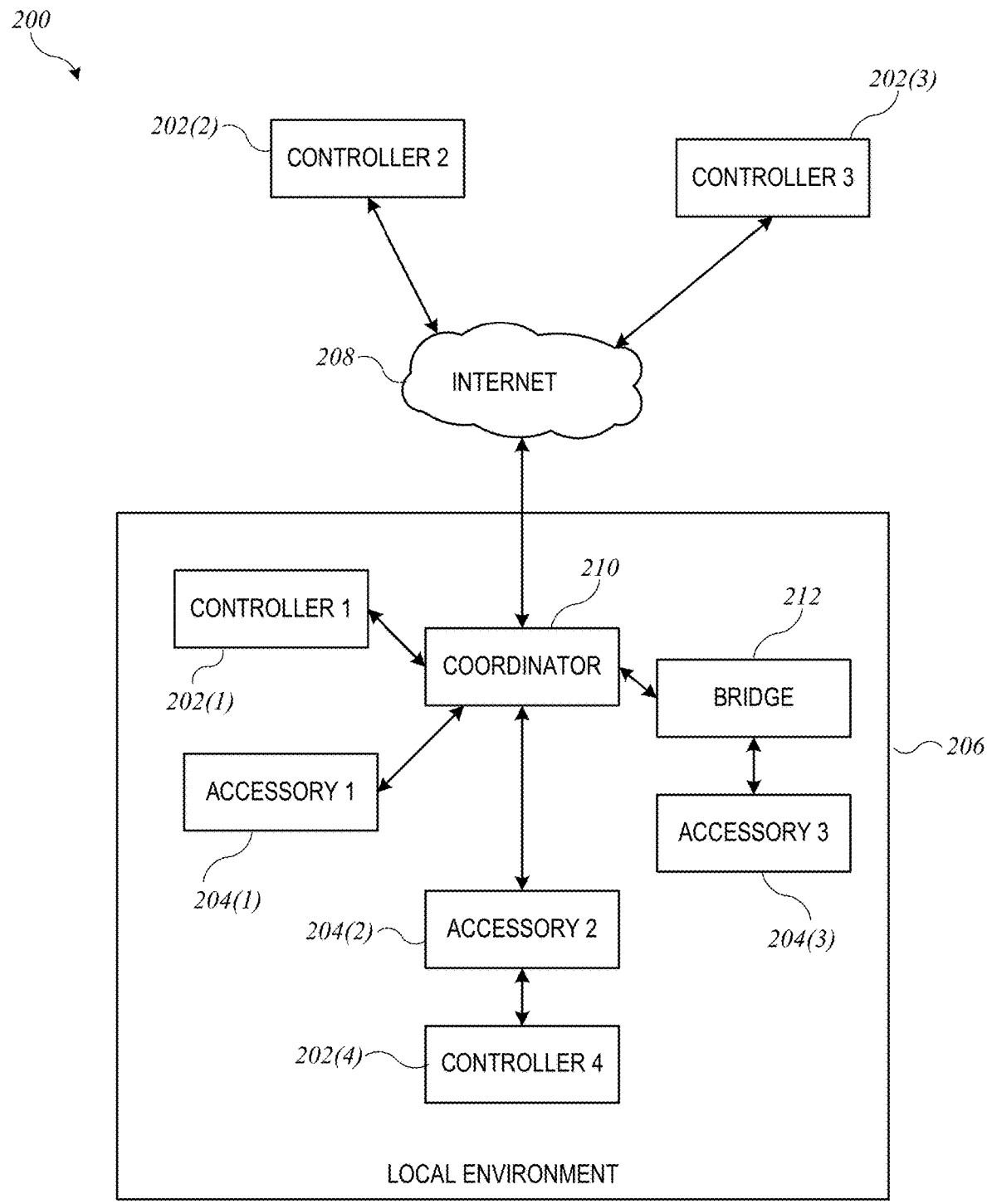
FIG. 2 shows a network configuration according to an embodiment of the present invention.

FIG. 2 shows a network configuration 200 according to an embodiment of the present invention. Configuration 200 allows controllers 202 to communicate with accessories 204 located in local environment 206 (e.g., a home environment) a via a coordinator 210. Each controller 202 can be an electronic device owned and/or operated by a user who frequents environment 206 (e.g., a resident of the home or a regular visitor to the home). Controllers 202 can each be similar to controller 102 of FIG. 1, and accessories 204 can be similar to various accessories shown in FIG. 1.

Accessories 204 can each communicate with a coordinator device (or "coordinator") 210 that can be located with local environment 206. As used herein, a "coordinator" can be an electronic device that is capable of operating as a controller of accessories 204 as well as relaying messages from other controllers (e.g., controllers 202) to accessories 204. In some embodiments, coordinator 210 can be an "intelligent" device that can coordinate operations among multiple controllers and/or accessories and is not limited to passively relaying messages. Coordinator 210 can include any device that is capable of presenting itself as a controller to accessories 204 and that is capable of communicating securely with controllers 202. In some embodiments, coordinator 210 can present itself to accessories 204 as a controller and to controllers 202 as an accessory that provides services for communicating with other accessories (e.g., accessories 204); examples are described in above-referenced U.S. application Ser. No. 14/725,891 In some embodiments, coordinator 210 can be a device that is expected to stay in local environment 206 and that is expected to be powered on and available for communication most or all the time. (It is to be understood that coordinator 210 can occasionally be unavailable, e.g., in connection with software or firmware upgrades, power outages, or other intermittent occurrences.) For example, coordinator 210 can be implemented in a desktop computer, a Wi-Fi or access-point unit, a dedicated accessory-control base station, a set-top box for a television or other appliance (which can implement coordinator functionality in addition to interacting with the television or other appliance), or any other electronic device as desired.

In some embodiments, coordinator 210 and accessories 204 can communicate using a local area network (LAN), such as a Wi-Fi network and/or a point-to-point communication medium such as Bluetooth LE. It is to be understood that other communication protocols can be used. In some embodiments, controllers 202, accessories 204, and coordinator 210 can support a uniform accessory protocol as described above that can be supported using both Wi-Fi and Bluetooth LE as transports.

In the example of FIG. 2, controllers 202(1) and 202(4) are currently located in local environment 206 with accessories 204 and coordinator 210. For example, controller 202(1) can be on the same LAN as accessories 204 and coordinator 210. Controllers 202(2) and 202(3) are currently located outside local environment 206 but are connected to a communication network 208 (e.g., the Internet); such controllers are said to be "remote" from accessories 204 and coordinator 210. It is to be understood that controllers 202 can be mobile devices that are sometimes within local environment 206 and sometimes outside local environment 206. Accessories 204 need not be mobile and need not be connected to communication network 208 (although they can be if desired). In some embodiments, coordinator 210 can be connected to communication network 208 and can facilitate access to accessories 204 by remote controllers 202(2) and 202(3).

In the example shown, controllers 202 can communicate with accessories 204 via coordinator 210, and coordinator 210 can be said to act as a "proxy" for accessories 204. Coordinator 210 can communicate directly with accessories 204(1) and 204(2). In the case of accessory 204(3), coordinator 210 can communicate via "bridge" 212. Bridge 212 can operate to relay commands between a controller and an accessory; in some embodiments, bridge 212 and/or coordinator 210 can also translate between different communication protocols used by coordinator 210 or controller 202 and accessory 204(3). Further, in some embodiments, bridge 212 can be implemented as a "tunnel" that can provide secure end-to-end communication between coordinator 210 and accessory 204(3). Examples of proxies, bridges, and tunnels are described in above-referenced U.S. application Ser. No. 14/725,891.

In some implementations of network configuration 200, controllers 202 can be configured to communicate with accessories 204 via coordinator 210 whenever possible. Thus, as shown, controller 202(1), which is in local environment 206, communicates with coordinator 210 rather than directly with accessories 204, as do remotely located controllers 202(2) and 202(3). Direct communication between any of controllers 202 and accessories 204 can be limited, e.g., to situations where coordinator 210 is not available. In other embodiments, controllers 202 may communicate directly with accessories 204 whenever they happen to be in range of each other (e.g., on the same Wi-Fi network or within Bluetooth range). For instance, as shown, controller 202(4) can communicate directly with accessory 204(2).

In some embodiments, coordinator 210 can be used to coordinate access by multiple controllers 202 to multiple accessories 204. For example, rather than establishing a pairing between each controller 202 and each accessory 204, controllers 202 can each establish a pairing with coordinator 210, and coordinator 210 can establish a pairing with each accessory 204. The same pair setup and/or pair add processes used to establish a controller-accessory pairing can also be used to establish a controller-coordinator pairing, with the coordinator acting in the role of accessory. For purposes of coordinator-accessory pairing, the coordinator can assume the role of controller. Thus, coordinator 210 can present itself as an accessory when communicating with a controller (e.g., any of controllers 202) and as a controller when communicating with an accessory (e.g., accessory 204).

Coordinator 210 can facilitate operation of an accessory network including accessories 204. For example, coordinator 210 can maintain an environment model for the accessory network and can provide the model (or portions thereof) to various controllers 202; examples of an environment model are described below. Controllers 202 can operate accessories 204 by interacting with coordinator 210.

In some embodiments, coordinator 210 can manage permissions associated with the accessory network or environment model to limit access by specific controllers 202 to some or all accessories 204. In some embodiments, controllers 202 can preferentially route all requests to accessories 204 through coordinator 210, and in some embodiments, accessories 204 can be configured to communicate directly only with coordinator 210 and to ignore requests that come directly from controllers 202. This can allow coordinator 210 to enforce permissions and other restrictions on access to accessories 204.

Centralizing communication with accessories through coordinator 210 can simplify management of a controller network and/or accessory network (e.g., controllers 202 and accessories 204 in local environment 206). For example, if a new accessory is acquired, the new accessory need only establish a pairing with coordinator 210 in order to allow all controllers 202 to have access to the new accessory. Similarly, if a new controller 202 is acquired, the new controller 202 need only establish a pairing with coordinator 210 to allow the new controller to have access to all accessories 204. In an environment with multiple controllers (e.g., a family where the members each have multiple devices) and perhaps dozens of accessories, the time saving can be considerable.

It should be noted that in configuration 200, it is possible that one or more of the controllers (e.g., controller 202(1)) can be permitted to communicate with one or more accessories (e.g., accessory 204(1)) indirectly (via coordinator 210) but not directly, regardless of whether controller 202(1) is in local environment 206. This might occur, for instance, if controller 202(1) has established a pairing with coordinator 210 but not directly with accessory 204(1). In some instances, this can provide enhanced security; for instance, an accessory that has a pairing established with coordinator 210 can refuse to establish any other pairings. However, there may be cases where direct access is desirable, and establishing a direct pairing between a certain accessory, e.g., accessory 204(1) and one or more controllers 202 can be permitted. For example, suppose that accessory 204(1) is a door lock and controller 202(1) is a mobile phone. If a direct pairing between accessory 204(1) and controller 202(1) is established, a user can use controller 202(1) to lock or unlock accessory 204(1) via direct communication, thereby locking or unlocking the door. This can be useful, e.g., in the event that coordinator 210 is temporarily unavailable. In some embodiments, coordinator 210 can be used to indicate to accessory 204(1) which of controllers 202 are authorized for direct access, and accessory 204(1) can establish pairings with authorized controllers 202. In some embodiments, accessory 204(1) can be configured to accept direct communication from an authorized controller 202 only when coordinator 210 is not available. Thus, the general rule can be that all communications with accessory 204 go through coordinator 210, with exceptions made on a per-accessory and per-controller basis.

Coordinator 210 can operate as an intelligent agent for allowing controllers to operate accessories, rather than simply relaying messages. For example, coordinator 210 can establish a pairing with each of controllers 202 and a pairing with each accessory 204. When controller 202(1), for example, receives a user request to interact with a specific accessory, e.g., accessory 204(1), controller 202(1) can establish a first pair-verified session with coordinator 210 and provide its instructions for accessory 204 to coordinator 210 via the first pair-verified session. Coordinator 210 can receive the instructions, establish a second pair-verified session with accessory 204 and send appropriate control messages to accessory 204 via the second pair-verified session. In some embodiments, coordinator 210 can be privy to the content of the instructions, and in some embodiments, the messages sent to accessory 204 need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204 to coordinator 210. Coordinator 210 can analyze the received instructions, e.g., to detect and resolve conflicts such as where controller 202(1) instructs coordinator 210 to turn accessory 204 on while controller 202(2) instructs coordinator 210 to turn accessory 204 off. Coordinator 210 can be programmed with priority rules or other rules for resolving conflicts (e.g., "on" takes priority over "off"; instructions from a controller with admin privilege take precedence over instructions from a controller without admin privilege; etc.). Coordinator 210 can apply the priority rules to resolve any conflicts and can communicate instructions to accessory 204 based on the resolution. When a response is received from accessory 204, coordinator 210 can determine whether to send a corresponding message (or a different message) to controller 202(1) and/or to controller 202(2). As another example, coordinator 210 can enforce permissions established for various controllers 202 and/or accessories 204. For example, when one of controllers 202 sends a request, coordinator 210 can apply decision logic to determine whether the controller 202 that sent the request has appropriate permission; if not, coordinator 210 can reject the request. The decision logic can be as simple or complex as desired; for instance, a controller belonging to a child may be limited as to which hours of the day or for how long it can operate a particular accessory (e.g., a TV) while a parent's controller can have unlimited access, or a controller associated with a guest (e.g., a babysitter) may be restricted to operating a certain subset of the accessories. Thus, coordinator 210 is not limited to acting as a passive relay for messages between controllers and accessories but can actively intervene to resolve conflicting instructions, enforce any limitations that may exist on the privileges or permissions granted to particular controllers or users, and so on.

It will be appreciated that network configuration 200 is illustrative and that variations and modifications are possible. Any number of controllers and any number of accessories can be included in a network configuration. In some embodiments, coordinator 210 can be replaced with a proxy that relays messages between controllers and accessories without necessarily reading the content of the messages. In some embodiments, coordinator 210 can be omitted entirely. Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

As noted above, coordinator 210 can be particularly useful in the context of an automated environment with a number of accessories that can be controlled. Examples include homes, cars or other vehicles, office buildings, campuses having multiple buildings, etc. For purposes of illustration, an example of an accessory network implementation for a home will be described; those skilled in the art with access to the present disclosure will understand that similar accessory networks can be implemented in other automated environments.

In one example of an accessory network, each accessory is connected to one or more controllers, and accessories can be controlled by sending messages, e.g., as described in above-referenced U.S. application Ser. No. 14/725,912 and U.S. application Ser. No. 14/614,914. This can be perfectly serviceable for small networks with just a few accessories. However, in some instances, particularly as the number of accessories increases, it can be helpful to establish meaningful (to a user) groups of accessories that can be managed in a coordinated fashion. Accordingly, certain embodiments of the present invention incorporate environment models usable to coordinate control across multiple accessories in an accessory network.

As used herein, an environment model can provide various logical groupings of the accessories in an environment. For example, a home environment can be modeled by defining "rooms" that can represent rooms in the home (e.g., kitchen, living room, master bedroom, etc.). In some cases, a room in the model need not correspond to a room in the home; for instance, there can be a "front yard" room or an "anywhere" room (which can be used to refer to accessories that are present in the home but whose location within the home is subject to change or has not been defined as a room). Each accessory in the home can be assigned to a room in the environment model, e.g., based on the actual physical location of the accessory. Rooms can be grouped into zones based on physical and/or logical similarities. For instance, an environment model for a two-level house might have an "upstairs" zone and a "downstairs" zone. As another example, an environment model might have a "bedrooms" zone that includes all bedrooms regardless of where they are located. The model can be as simple or complex as desired, e.g., depending on the size and complexity of the environment.

Where an environment model is defined, accessories represented in the environment model can be controlled individually or at the level of rooms, zones, or the whole model. For instance, a user can instruct a controller or coordinator to turn on all the outside lights or to turn off all accessories in a specific room.

Other groupings of accessories can also be defined. For example, in some embodiments, a user can augment an environment model by grouping various accessories into "service groups" that can include any set of accessories the user may desire to control together, at least some of the time. A service group can include accessories in any combination of rooms or zones, and the accessories in a service group can be homogeneous (e.g., all upstairs lights) or heterogeneous (e.g., a light, a fan, and a TV). In some embodiments, a user can provide a single instruction to a controller to set the state of an entire service group (e.g., turn the group on or off). While not required, the use of service groups can provide another degree of flexibility in coordinating control over multiple accessories.

In some embodiments, the environment model for a given environment can be represented as a data object (or set of data objects). The environment model can be created on a controller associated with the environment (e.g., a controller with admin privileges) and can be shared with other controllers through a synchronization operation. For instance, controllers 202 of FIG. 2 can synchronize with a "master" copy of the environment model maintained by coordinator 210 (which can receive updates from controllers 202), or cloud-based synchronization (in which the master copy is stored in a location accessible via network 208 and automatically synchronized with the controllers and coordinator(s) associated with the environment) can be used. Accordingly, all controllers and coordinators associated with a given environment can have shared access to the same environment model.

Additional examples related to defining and using an environment model are described in above-referenced U.S. application Ser. No. 14/725,912. It is to be understood that an environment model is not required to make use of at least some of the features described below.

Triggered Action Sets

One model for coordinated control of multiple accessories can be based on a "triggered action set," or "trigger." A triggered action set can define a set of actions to be taken upon occurrence of certain events or conditions. In some embodiments, execution of a triggered action set (also referred to as "executing a trigger") can occur in stages. At a first stage, a "triggering event" is detected at a controller (e.g., any of controllers 202 described above) or a coordinator (e.g., coordinator 210 described above). In response to detecting the triggering event, the controller 202 (or coordinator 210) that detects the event can test whether a "triggering condition" is satisfied. If so, then one or more "resulting actions" can be performed. Accordingly, a user can define a triggered action set by specifying a triggering event, a triggering condition, and one or more resulting actions.

Figure 3:
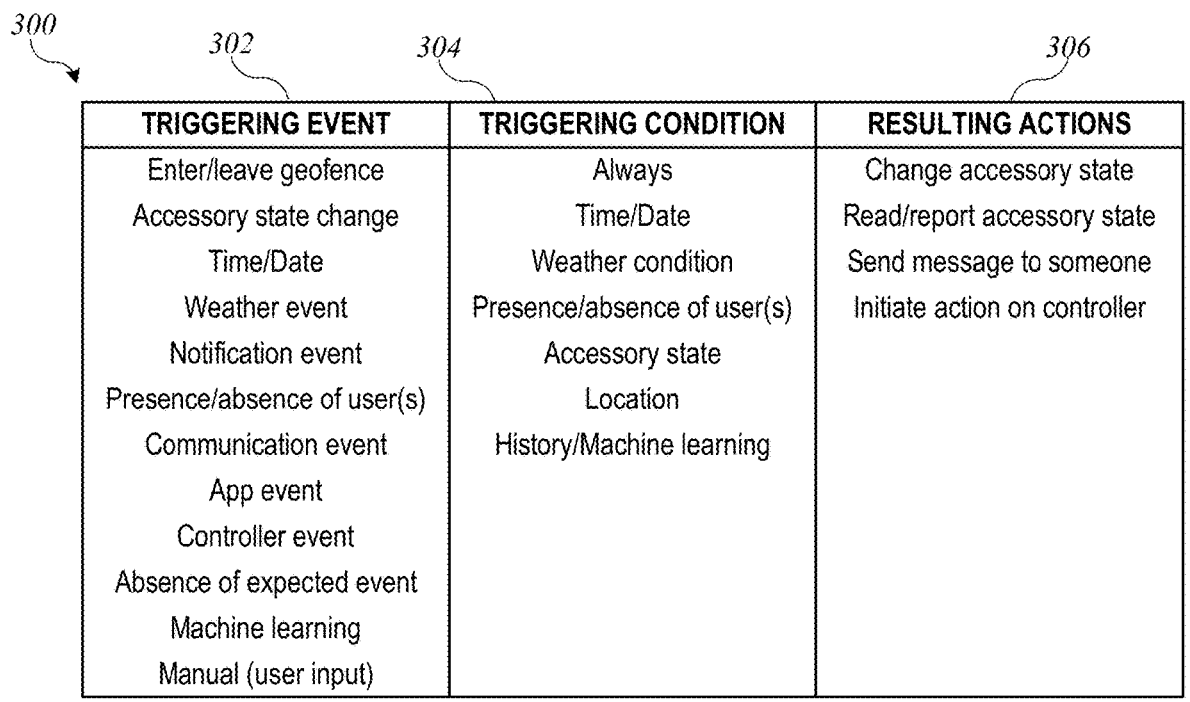
FIG. 3 shows a table listing options for defining triggered action sets according to an embodiment of the present invention.

FIG. 3 shows a table 300 listing options for defining triggered action sets according to an embodiment of the present invention. Column 302 lists examples of triggering events. As used herein, a triggering event can be any occurrence that is detectable by a controller (e.g., any of controllers 202 described above) or a coordinator (e.g., coordinator 210 described above). Column 302 lists examples of categories of detectable triggering events. A "geofence" can be defined relative to the location of local environment 206, e.g., within half a mile, within 1000 feet, etc. Controllers 202 (or other user devices) that have the ability to determine their location (e.g., using Global Positioning Service (GPS) receivers, RF fingerprinting, or the like) can detect when they enter or leave the geofence and can report this event to other controllers 202 and/or to coordinator 210. In some embodiments, controller 202 can test for a triggering condition in response to detecting that it or another controller 202 has entered or left the geofence; additionally or instead, controller 202 can report the event to coordinator 210, which can test for triggering conditions. Thus, a triggering event can be defined based on any controller (or a specific controller) entering or leaving the geofence. In some embodiments, more fine-grained geographic triggering events can be supported, such as detecting when a user (or device) enters or leaves a particular room within the home.

An accessory state change event can be detected when a controller or coordinator receives notification of the state change from the accessory. State-change notifications by an accessory to a controller can be implemented in a uniform accessory protocol, e.g., as described in above-referenced U.S. application Ser. No. 14/614,914. (It should be understood that since coordinator 210 can operate as a controller in relation to accessory 204, coordinator 210 can receive state-change notifications from accessories in the same manner as other controllers.) Any change to any aspect of an accessory state can be used as a triggering event. For example, if an accessory has a motion sensor that detects movement in the vicinity of the accessory, a state change can occur when the motion sensor begins to detect movement, and this state change can be a triggering event. Similarly, any other changes in the accessory's environment that can be detected by sensors of the accessory can be used to define triggering events.

A time/date event can be an event defined by reference to clocks and/or calendars. Examples of time/date events can include "daily at 10:00 pm," "Saturday at 8:00 am," and so on. Any controller or coordinator that has access to clock and/or calendar data to determine the current time and/or date can detect when a time/date event occurs.

A "weather" event can be tied to external conditions that may change at irregular intervals and that may be difficult or impossible to predict. Examples of weather events include sunrise and sunset, which can happen at different times depending on the date and location. Other examples include an outside temperature exceeding or falling below a threshold, rain starting or stopping, barometric pressure changes, wind speed reaching a threshold value, ambient light levels above or below a threshold, seismic activity, or the like. A controller or coordinator can detect weather events using various techniques. For example, a controller or coordinator can periodically poll an online weather service or the like to retrieve weather data. Alternatively, weather sensors (e.g., thermometer, anemometer, barometer, light sensor) can be installed outside the home, and weather data can be retrieved from the sensors. Sunrise and sunset times, which are variable with location and date but much more predictable in their variations than most weather events, can be calculated based on the location of the home and the calendar date or obtained from an online service.

A "notification" event can include any type of electronic message signal that is generated at a source and receivable by a coordinator or controller, regardless of source. For instance, a coordinator or controller may be able to receive emergency broadcast messages (e.g., tornado warning, tsunami warning, seismic activity alerts). As another example, a coordinator may receive notifications from one of the controllers associated with the home (e.g., a notification that the schedule of the controller's user has changed); in some embodiments, such notifications can be generated by a controller that is temporarily absent from the local environment. As yet another example, a coordinator may receive notifications from a coordinator in a different local environment (e.g., a neighbor's home, assuming the neighbor has authorized the sharing of notifications); such a notification can include, e.g., weather-related information based on weather sensors the neighbor has installed, security information (such as detecting a possible break-in or suspicious activity), or the like.

Presence or absence of users can be determined using presence sensors in the home and/or by the presence or absence of particular user devices that each user generally carries on his or her person. For instance, coordinator 210 can detect which controllers 202 are present in local environment 206 and can infer presence or absence of the users of controllers 202 accordingly.

A "communication event" can be detected based on a controller receiving or initiating a communication with some other user's device. For example, a communication event can correspond to receiving or placing a phone call (to any number or to a specified number or contact of the user), receiving or sending a text message (to anyone or to a specified contact of the user), or the like.

An "app event" can be initiated by an application program ("app") executing on a controller. In some embodiments, the operating system of the controller device can provide an application program interface (API) function call that an app can invoke to indicate a triggering event. The app can be programmed to invoke the function call under various conditions, such as when the app launches or exits, when an error occurs within the app, or when the user performs a particular interaction with the executing app. A controller that receives an indication of a triggering event from an app can proceed with trigger execution or notify one or more other controllers and/or coordinators of the event, allowing other devices to execute the associated trigger.

A "controller event" can be based on a state change of the controller itself. For example, the controller might become connected to a charger or disconnected from a charger. In some embodiments, the controller may communicate with a wearable device worn by the user, and state changes of the wearable device (e.g., wearable device being put on or taken off, wearable device becoming connected to or disconnected from a charger) can be detected by the controller and treated as controller events that may trigger actions. In some embodiments, a controller may go into or out of communication with other devices (including devices that are neither controllers nor accessories), and such occurrences can be defined as controller events. For example, when a user carrying or wearing a controller enters a suitably equipped vehicle, the user's controller may establish communication with the vehicle; establishing or terminating communication with a vehicle can be treated as a controller event.

In some embodiments, absence of an expected event can itself be detected as a triggering event. For instance, if a user normally arrives home by 6:00 pm, the continued absence of the user at a later time (e.g., 8:00 pm or 10:00 pm) can be detected as a triggering event.

In some embodiments, machine learning can be used to define triggering events, e.g., based on analysis of the users' behavior across time. Such analysis can be performed, e.g., by coordinator 210 and may be arbitrarily complex. For instance, coordinator 210 can observe user interactions with various accessories and detect a pattern, such as "the user turns off the automatic sprinklers if it rains for longer than 10 minutes." Based on this pattern, coordinator 210 can define "raining for longer than 10 minutes" as a triggering event.

Manual user input can also be a triggering event. For instance, the user can expressly instruct a controller to initiate a specific action set.

When a triggering event is detected, the controller or coordinator that detects the triggering event can test one or more triggering conditions associated with the trigger to which the triggering event pertains. In some embodiments, a controller that detects a triggering event can report the event to the coordinator, and the coordinator can test the triggering condition(s). Column 304 lists examples of categories of testable triggering conditions.

In some embodiments, the "always" condition indicates that resulting actions should be executed whenever the triggering event is detected. For instance, an action set defined with a manual triggering event can have the triggering condition defined as "always," with the result that the user can invoke the action set manually at any time. Triggering conditions based on time/date, weather conditions, and presence/absence of user(s) can be defined similarly to the corresponding categories of triggering events. Thus, for example, detection of a weather event can result in testing a time/date condition to determine whether to execute resulting actions.

Accessory state triggering conditions can be based on the current state of an accessory at the time of the triggering event and/or on evolution of the accessory state following the triggering event. For example, in response to detecting a triggering event, a controller or coordinator that detects the triggering event can send a read request to a particular accessory to determine its state. In some embodiments, a triggering event can be a state change of one accessory (e.g., a front door changes from unlocked to lock state) while the triggering condition can be based on the state of another accessory (e.g., whether the garage door is locked). As another example, a triggering event can be a state change of an accessory (e.g., a motion sensor of the accessory detects movement in the vicinity), and the triggering condition can be based on whether the state persists for a minimum amount of time (e.g., whether the motion continues to be detected for 1 minute, 5 minutes, or some other interval).

Location conditions can be based on the location of the controller that detected the event and/or the location of another user (or the other user's device). For example, a triggering event might be sunset, and the triggering condition can be that the user is not at home; the resulting action can be to turn on a porch light.

Machine learning can be used to detect historical trends and behavior patterns. For instance, if the user normally turns on certain lights upon arriving at home, a triggering condition can be based on whether those lights are on when the triggering event of the user entering a geofence around the home occurs. As another example, machine learning algorithms may determine that the user normally closes the garage door when leaving; a triggering condition can be based on whether the garage door is closed when the triggering event of the user leaving a geofence around the home occurs.

Column 306 lists examples of categories of "resulting actions" that can be implemented in response to a triggering condition being satisfied. One category pertains to changing an accessory's state. For example, a controller or coordinator that detects a triggering event can test the triggering condition associated with the triggering event. If the condition is satisfied, the controller or coordinator can issue one or more write requests to one or more accessories to change their state. Thus, for example, a trigger can be defined as: "When front door changes state from unlocked to locked (triggering event), check state of garage door; if garage door is not locked (triggering condition), then lock garage door." Detecting the state change of the front door can be based on a notification from the front-door accessory. Checking the state of the garage door can be done by sending a read request to the garage door accessory, and locking the garage door can be done by sending a write request to the garage door accessory.

Another category of resulting actions pertains to reading and reporting an accessory's state. For example, if a triggering condition is satisfied, the controller or coordinator can issue one or more read requests to one or more accessories to determine their state and can notify the user of the same (e.g., through a pop-up notification or push notification on the user's controller device). Thus, for example, assuming that a window in a home can be operated as an accessory, a trigger can be defined as "When it starts raining (triggering event), determine whether the user is home; if the user is not home (triggering condition), read the state of the window and report the state to the user." The user then may be able to remotely close the window.

In some embodiments, the resulting actions can include actions other than interacting with an accessory. For instance, as described above, a controller can be implemented on a smart phone or other device that may support other functions in addition to communicating with accessories. In some embodiments, in response to detecting a triggering condition, the controller can invoke other functions of the device. For instance, the controller may invoke a messaging function of the device (e.g., email, SMS) to send a message to someone. The controller may also launch application programs on the device (e.g., a music playing program). Thus, for example, a trigger can be defined as "When the user arrives home (triggering event), if a speaker system is not playing music (triggering condition), launch a music app and connect it to the speaker system (resulting action)."

As these examples show, the general form of a trigger, or triggered action set, can be "When (triggering event) occurs, check (triggering condition); if (triggering condition) is true, then execute (resulting actions)." A user can define a trigger by specifying the triggering event, triggering condition, and resulting action from the categories of table 300 or other categories as desired. In various embodiments, the triggering events and/or triggering conditions can be defined with any degree of complexity (e.g., "If it is after dark and not a Tuesday and no users are home, then . . . "). Any number of resulting actions can be triggered by the same triggering event and/or triggering condition.

As a further illustration, FIG. 4 shows a table 400 listing examples of triggers, or triggered action sets, that can be defined according to an embodiment of the present invention. Each triggered action set can have a user-assigned (or system-assigned) name 402, a triggering event 404, a triggering condition 406, and one or more resulting actions 408 to be taken (e.g., by sending control messages to accessories). While three examples are shown, any number of triggered action sets can be defined. In some instances, some triggered action sets can be predefined by a provider of the accessory management system, and a user can customize the predefined action sets or add others as desired.

For example, "coming home" triggered action set 410 can be triggered based on a geofence triggering event, such as when a controller (e.g., controller 202(2) of FIG. 2) enters within a certain radius of the home (e.g., half a mile or 1000 feet or the like). The location of controller 202(2) can be determined using an onboard GPS system or the like, and controller 202(2) can send a message to coordinator 210 when its location crosses within the defined geofence, informing coordinator 210 that the triggering event has been satisfied. The triggering condition can be that the time is after sunset. The "coming home" actions can include, e.g., turning on a light in a foyer, setting a thermostat to a desired temperature, and/or other actions as desired. Upon receiving the message that controller 202(2) has crossed into the geofence, coordinator 210 can determine whether the current time is after sunset, and if so, coordinator 210 can send control messages to effect the actions. In some embodiments, controller 202(2) can send the control messages to the accessories either directly or through a proxy or other intermediary as desired, and use of coordinator 210 is not required.

"Movie watching" triggered action set 412 can be triggered manually, i.e., by an express user instruction. For instance, a user can select "movie watching" from an activity list presented by a controller, or say a designated phrase such as "start movie-watching" to a voice-control interface of a controller. In this case, the triggering condition is "always," so that movie-watching actions are performed whenever the user inputs the appropriate instruction. Actions to be performed in response to the triggering event can include turning off a light in the kitchen, dimming lights in the family room, turning on the TV in the family room, and invoking a movie-selection interface for the TV. The movie-selection interface can, for example, provide a set of menus or search interfaces via which the user can select locally stored movies or movies available from a streaming media source to which the TV is connected. (In some embodiments, the TV may be connected to a set-top box or other device that is able to provide streaming media from local and/or remote sources to the TV.) In the latter case, invoking the movie selection interface can include instructing the TV to connect to the streaming media source and obtain information about available movies. (It is to be understood that any type of video content can be treated as a "movie" in this context.)

"Sleep" triggered action set 414 can be triggered at a particular time each day, e.g., 10 pm or some other time when residents of the home normally go to bed. In this example, the triggering event is set to 10 pm and the triggering condition is set to "weeknight" (which can be defined to refer to Sunday through Thursday nights); accordingly, the "sleep" action set would not automatically be triggered at 10 pm on Friday or Saturday nights. Examples of sleep actions can include turning off all lights in the downstairs zone and in the children's bedrooms; turning off the TV in the family room; dimming the lights in the master bedroom; and starting playback of a "bedtime" music playlist on a music player in the bedroom.

In some embodiments, triggered action sets with an automatic trigger can also be triggered manually, for instance by the user speaking a command to a voice-control interface of a controller, selecting a trigger from a graphical user interface of a controller, performing a gesture detected by a gesture-based controller, or the like. In some embodiments, some or all triggered action sets can have "colloquial" voice commands defined; for instance, the user might be able to say something like, "Good night, home," to invoke sleep action set 414. Where the user invokes a trigger manually, triggering events and conditions need not be tested.

The examples in FIG. 4 are merely illustrations. Other triggered action sets (or triggers) are possible. As described above, in some instances, a triggering event can be based on a state change in some accessory. For example, suppose that a household has a sprinkler system and a dishwasher, and it is desirable to run the sprinklers after the dishwasher has finished. An action set to start the sprinklers can be triggered by a state change in the dishwasher from "cycle in progress" to "cycle complete" or the like. A coordinator or other controller can monitor one accessory to detect state changes (notification processes and other examples of controllers detecting accessory state changes are described in above-referenced U.S. application Ser. No. 14/614,914) and can automatically send messages to another accessory when a particular state change is detected.

A trigger can include any number of resulting actions, and in some instances, the same set of resulting actions can have multiple different triggering events and/or triggering conditions. Further, while examples described herein may refer to a single triggering event and a single triggering condition, it is to be understood that various combinations of multiple triggering events and/or conditions can be defined for triggering execution of an action set. Combinations can be formed using logical operations (e.g., AND, OR, XOR, AND NOT, etc.), and the triggering logic can be as simple or complex as desired. For instance, a trigger can be defined as: "when the front door becomes unlocked or when the garage door is opened [an OR of multiple triggering events] and if it is after sunset and a weekday [an AND of triggering conditions], then present a notification to the user of a possible unauthorized entry." Numerous other examples are possible.

It should be understood that in any instance where the user is controlling a coordinated group of accessories (e.g., within a room, zone, or service group, or trigger), accessory control can be effected by sending individual messages to each accessory in the group, using a pair-verified session between a controller and that accessory. The accessories do not need to communicate with each other or even to be aware of each other's existence. Depending on implementation, the controller can be the controller operated by the user (if it communicates directly with the accessories being controlled), or it can be a coordinator such as coordinator 210 of FIG. 2. In the latter case, the user's controller can issue instructions to the coordinator at the granularity of the group being controlled (e.g., "turn on security lights group"), and the coordinator can use table 400 or similar data structures to determine which accessories should receive control messages. Similarly, the user's controller can issue an instruction such as "execute movie watching trigger" to a coordinator, and the coordinator can use table 400 or similar data structures to determine which accessories should receive control messages.

In some embodiments, users can define multiple triggered action sets with various triggering events and/or triggering conditions. Where an accessory state change can be a triggering event for a triggered action set, it is possible that execution of one triggered action set may result in an occurrence of the triggering event for another triggered action set. This can result in conflicting or "inconsistent" triggered action sets. For example, a first triggered action set may include a resulting action that triggers a second action set, which may undo an effect of the first triggered action set, or execution of the second action set may retrigger the first action set (potentially leading to a loop where the action sets are performed repeatedly). As another example, two different triggered action sets may specify incompatible resulting actions in response to the same triggering event. For instance, one triggered action set may specify that the TV in the living room is to be turned on at 10:00 p.m. while another triggered action set specifies that the same TV is to be turned off at 10:00 pm.

To avoid conflicts, some embodiments may provide "consistency checking" logic (e.g., within a controller or coordinator) that determines whether a newly-defined triggered action set conflicts with any previously-defined triggered action set. For example, the controller device can access, as part of the environment model, a list of existing triggered action sets. When the user operates an interface of the controller device to define a new triggered action set, the controller device can perform consistency checking between the new triggered action set and the existing triggered action sets. If the consistency check fails, the controller device can decline to add the new triggered action set to the list of existing triggered action sets. The user can be informed of the specific reason for declining and can correct the problem, thereby allowing the new triggered action set to be added.

Various consistency checks can be implemented. For example, the controller device can determine whether the triggering event or triggering condition for the new triggered action set corresponds to a resulting action of an existing triggered action set. If not, then the new action set can be deemed consistent and added to the list of existing triggered action sets. If the triggering event or triggering condition for the new triggered action set does correspond to a resulting action of an existing triggered action set, then the controller device can determine whether performing the resulting actions of the new triggered action set will trigger any existing action set. Based on that determination, the controller device can trace the effect of those resulting actions on other existing triggered action sets, thus constructing a chain of triggered action sets; the chain can end when the controller identifies a triggered action set whose resulting actions do not trigger any other triggered action set. A chain can also be constructed in the reverse direction, e.g., by determining whether the resulting action of the new triggered action set corresponds to a triggering event or triggering condition for an existing triggered action set. When a chain of triggered action sets is constructed, inconsistencies can be detected across any number of links in the chain (e.g., performing action set A triggers action set B, which triggers action set C, which triggers action set A again). In some embodiments, the controller device can also determine whether a new triggered action set is "internally inconsistent," e.g., whether the resulting actions include the triggering event. For purposes of consistency checking, manually-triggered action sets can be ignored, since the user can break the "chain" by not performing the manual trigger.

Additional examples of triggered action sets and user interfaces for defining triggered action sets are described in above-referenced U.S. application Ser. No. 14/725,912.

Delegating Execution of a Trigger

In the manner described above, a triggered action set, or trigger, can be defined on any controller device. However, the controller device on which the trigger is defined may not always be the device that can execute the trigger most efficiently or effectively. For instance, referring to FIG. 2, a trigger can be defined on controller device 202(2), which can, at various times, be remote from local environment 206. This can make it more difficult for controller 202(2) to execute the trigger. For example, the triggering event might be an event that occurs within local environment 206 (e.g., a particular accessory 204 starting or stopping an operation or otherwise changing its state). Controller 202(2) can detect the triggering event by receiving a state-change notification from the relevant accessory 204. If, for some reason, controller 202(2) cannot connect to network 208 at a given time, it may not be possible for controller 202(2) to receive a notification or to send control messages to one or more accessories 204 to perform the action set associated with the trigger when the triggering event occurs.

Accordingly, certain embodiments of the present invention provide mechanisms whereby a controller can delegate execution of a trigger to another controller, e.g., to coordinator 210 of FIG. 2.

Figure 5:
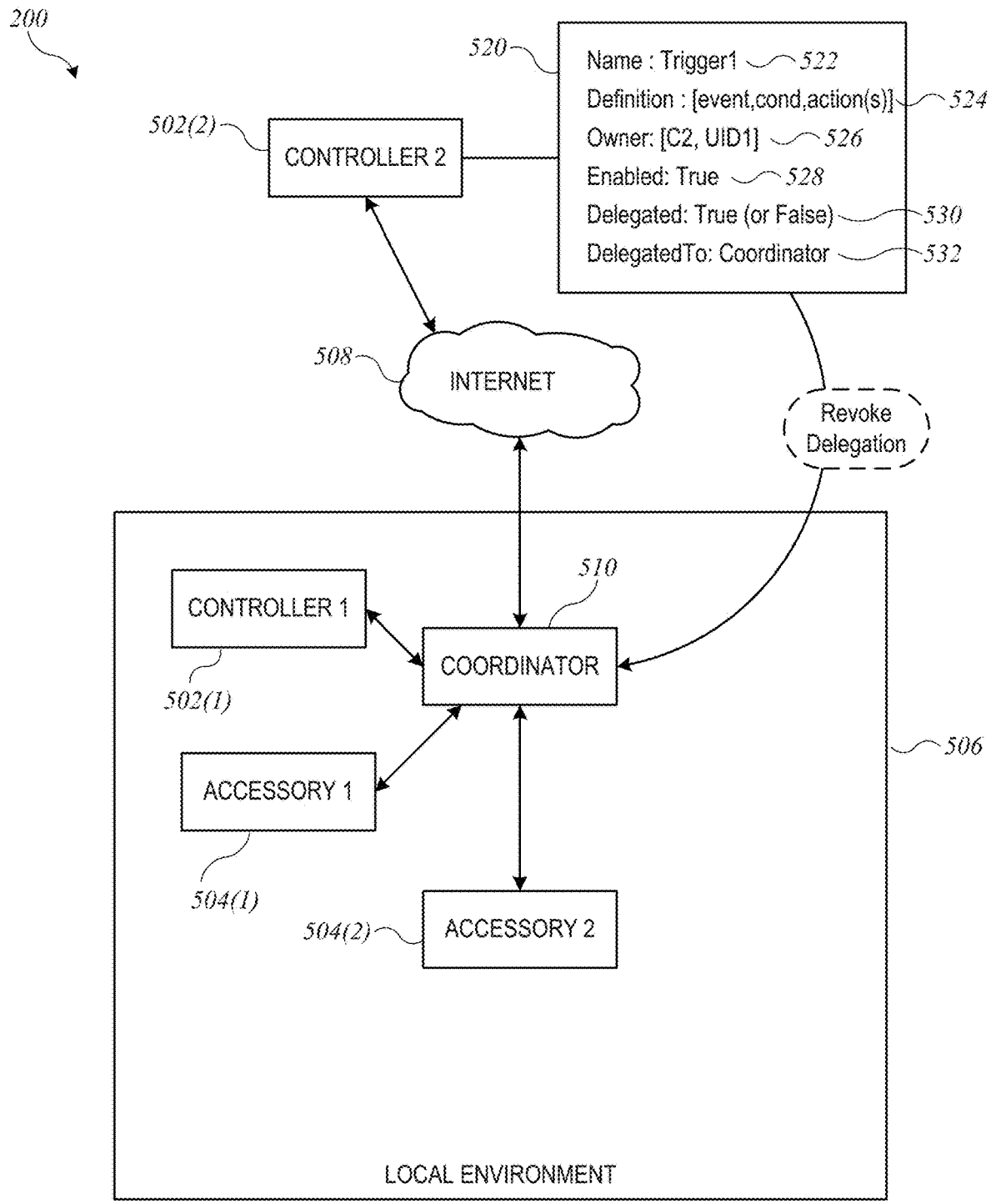
FIG. 5 shows a network configuration according to an embodiment of the present invention in which a trigger is delegated from a controller to a coordinator.

FIG. 5 shows a network configuration 500 according to an embodiment of the present invention in which a trigger is delegated from a controller to a coordinator. Configuration 500 can be generally similar to network configuration 200 of FIG. 2. Controllers 502 (which can be similar or identical to controllers 202 of FIG. 2) can communicate with accessories 504 (which can be similar or identical to accessories 204 of FIG. 2) located in local environment 506 (which can be similar or identical to local environment 206 of FIG. 2) via a coordinator 510 (which can be similar or identical to coordinator 210 of FIG. 2).

In the example of FIG. 5, controller 502(1) is currently located in local environment 506 with accessories 504 and coordinator 510. For example, controller 202(1) can be on the same LAN as accessories 204 and coordinator 210. Controller 502(2) is currently located outside local environment 206 but is connected to a communication network 508 (e.g., the Internet). In some embodiments, coordinator 510 can be connected to communication network 508 and can facilitate access to accessories 504 by remote controller 502(2).

In this example, a user can interact with controller 502(2) to define a trigger (or triggered action set). In some embodiments, the user can input a triggering event, triggering condition and action set to be performed (e.g., as described above with reference to FIGS. 3 and 4 and in above-referenced U.S. application Ser. No. 14/725,912). In some embodiments, controller 502(2) can generate a proposed trigger, e.g., as a result of pattern analysis on the automated environment, and present the proposed trigger to the user to accept or reject.

In some embodiments, a trigger can be represented using a trigger data object 520. Trigger data object 520 can include a name or other identifier 522 (e.g., similar to column 402 of FIG. 4) and a trigger definition 524 (e.g., triggering event, triggering condition, and resulting action(s) as shown in FIG. 4). Trigger data object 520 can also include an Owner field 526, which can include an "owning device" identifier (e.g., controller identifier "C2") that identifies the controller on which the trigger was created (or to which ownership of the trigger was subsequently reassigned) and/or an "owning user" identifier (e.g., "UID1") that identifies the user to whom the owning device belongs. In some embodiments ownership of a trigger can be reassigned; examples are described below. Enabled field 528 can indicate whether the trigger is enabled or disabled, i.e., whether or not the executing device should monitor for the triggering event and triggering condition and take the resulting actions. This allows a trigger to be defined but disabled. For instance, if the user is deviating from a normal daily routine (e.g., due to a vacation from work), triggers associated with going to sleep or waking up might be disabled. Delegated field 530 can indicate whether execution of the trigger has been delegated to a controller other than the owning device (e.g., to coordinator 510); if so, then DelegatedTo field 532 can identify the device to which execution has been delegated.

To delegate a trigger, controller 502(2) can send a "delegation" message to coordinator 510 (or other delegate). In some embodiments, the delegation message can include trigger data object 520. Prior to sending the delegation message, controller 502(2) can populate Delegated field 530 with the value "true" and DelegatedTo field 532 with the identifier of coordinator 510. The delegation message can be communicated in various ways. For example, as described above, coordinator 510 can present itself as an accessory to controller 502(2), and its accessory definition can include a "delegation" service to which delegation messages can be directed. Other implementations can also be used. For instance, some embodiments can support synchronization of trigger data objects among controllers and/or coordinators (e.g., as part of an environment model as described above), and delegation of a trigger can be communicated via a synchronization operation; examples are described below; where automatic synchronization is used, an explicit delegation message may not be needed.

After delegating a trigger, controller 502(2) can retain a copy of trigger data object 520. As described below, if coordinator 510 (or other delegate) is not able to execute the trigger, retaining a copy of trigger data object 520 can allow controller 502(2) to resume responsibility for executing the trigger.

Figure 6:
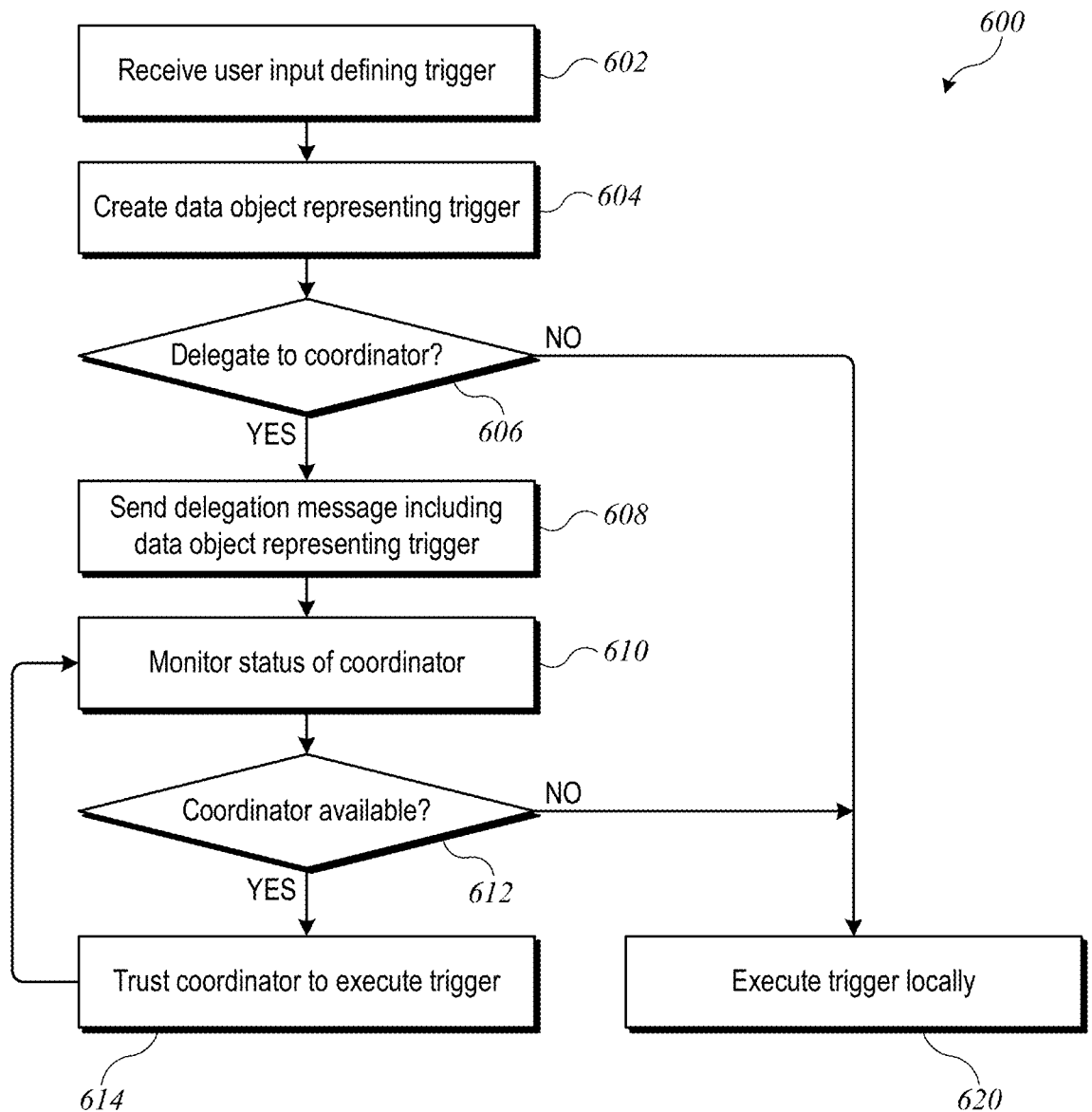
FIG. 6 shows a flow diagram of a process for delegating a trigger according to an embodiment of the present invention.

FIG. 6 shows a flow diagram of a process 600 for delegating a trigger according to an embodiment of the present invention. Process 600 can be executed, e.g., by controller 502(2) of FIG. 5 (or any other controller) and can be implemented, e.g., using suitable program code executed by a processor.

At block 602, controller 502(2) can receive user input defining a trigger. For example, the user input may specify a triggering event, triggering condition and action set to be performed (e.g., as described above with reference to FIGS. 3 and 4 and in above-referenced U.S. application Ser. No. 14/725,912). In some embodiments, controller 502(2) can automatically generate a proposed trigger, e.g., as a result of pattern analysis on the automated environment, and present the proposed trigger to the user to accept or reject. In this case, the user input defining the trigger can include user input accepting a proposed trigger.

At block 604, controller 502(2) can create a data object representing the trigger, e.g., similar to trigger data object 520 of FIG. 5. In some embodiments, the data object can be created as the user input is received. Owner field 526 can be populated with the controller identifier of controller 502(2) and a user identifier of the user operating controller 502(2) to define the trigger. Initially, Enabled field 528 can be set to false until the user finishes defining the trigger, at which time it can automatically be set to true by default. In some embodiments, a user interface can be provided to allow the user to enable or disable triggers, and Enabled field 528 can be updated based on input received via the user interface. Delegated field 530 can initially be set to false, and DelegatedTo field 532 can be empty (or store a null value).

At block 606, controller 502(2) can determine whether to delegate the trigger to another controller (e.g., to coordinator 510 of FIG. 5). In some embodiments, the user can be prompted to indicate whether to delegate the trigger. In other embodiments, the decision to delegate can be independent of user input. For example, controller 502(2) can determine whether a coordinator is available in the automated environment to which the trigger pertains and can implement logic that always delegates triggers to the coordinator if one is available. As another example, controller 502(2) can determine whether to delegate a trigger on a case-by-case basis. For instance, if the triggering event is based on controller 502(2) entering or leaving a geofence (e.g., as described above), it may be easier for controller 502(2) to detect the triggering event than for coordinator 510 to detect it. In that case, it may be desirable not to delegate the trigger. Other decision logic can also be used, e.g., based on whether controller 502(2) or coordinator 510 can more efficiently or reliably execute the trigger (i.e., detect the triggering event and triggering condition and perform the resulting actions when appropriate).

If the determination is made not to delegate the trigger, then at block 620, controller 502(2) can execute the trigger locally. For example, depending on the particular triggering event, controller 502(2) can register, or subscribe, to be notified of accessory state changes corresponding to the triggering event or activate other logic to detect the triggering event (or triggering events as the case may be). When the triggering event is detected, controller 502(2) can proceed to test the triggering condition (which can include an "always" condition or other condition, or multiple conditions, as described above) and, if the triggering condition(s) is (are) satisfied, execute the resulting action(s), e.g., by sending control messages to one or more accessories 504.

If, at block 606, the determination is made to delegate the trigger, then at block 608, controller 502(2) can send a delegation message to coordinator 510 (or other delegate device selected at block 606). For example, coordinator 510 can present itself to controller 502(2) as an accessory that provides a "delegation" service, and controller 502(2) can send the delegation message as a write request to the delegation service. Other implementations are also possible. The delegation message can include a copy of trigger data object 520, with Delegated field 530 set to true and DelegatedTo field 532 including the identifier of the selected delegate (e.g., coordinator 510). In some embodiments, coordinator 510 can send a response to controller 502(2) confirming receipt of the delegation message and/or otherwise indicating that coordinator 510 has accepted responsibility for execution of the trigger; if the confirmation response is not received, then the delegation was not successful, and controller 502(2) can execute the trigger locally. In some embodiments, controller 502(2) can delegate the trigger by updating Delegated field 530 and DelegatedTo field 532, then synchronizing updated trigger data object 520 as part of the environment model; an explicit delegation message from controller 502(2) to the selected delegate is not required.

At block 610, after delegating the trigger, controller 502(2) can monitor the status of coordinator 510 (or other delegate). For example, controller 502(2) can periodically ping coordinator 510 to verify that it is still powered on, communicating, and capable of communicating with accessories 504 in local environment 506. Various circumstances can occur that may render coordinator 510 unavailable to execute a trigger that has been delegated. For example, coordinator 510 might be powered down or might lose its communication connection. In some embodiments, coordinator 510 is operative as part of an automated environment (e.g., able to communicate with accessories 504) only when a user who has rights to access the automated environment has signed in to an account through coordinator 510. If coordinator 510 enters a "signed out" state (i.e., where no user with access rights is signed in), then coordinator 510 may become unable to execute triggers. In some embodiments, controller 502(2) can detect such conditions at block 610, e.g., by periodically polling the status of coordinator 510 and/or by registering for notifications of status updates (or a periodic "heartbeat" notification) from coordinator 510.

At block 612, as long as controller 502(2) determines that coordinator 510 remains available (e.g., communicatively coupled to the accessories and signed in if required), the trigger can remain delegated, and at block 614 controller 502(2) can continue to trust that coordinator 510 is executing the trigger. If, however, coordinator 510 is determined to be unavailable at block 612, then at block 620, controller 502(2) can begin executing the trigger. In some embodiments, when controller 502(2) determines that coordinator 510 is unavailable, controller 502(2) can expressly revoke the delegation, e.g., by updating trigger data object 520 to reflect that the trigger is no longer delegated (e.g., writing "false" to Delegated filed 530) and/or sending a message to coordinator 510 indicating that the previous delegation has been revoked. It should be noted that coordinator 510 might, unknown to controller 502(2), still be executing the trigger at this point; however, such duplicated execution need not cause a problem for the user or the accessories. For instance, as a result of two controller devices (e.g., controller 502(2) and coordinator 510) executing the same trigger, an accessory might receive the same control message (e.g., an instruction to turn on, in the form of a message writing an "on" value to a power characteristic) from two different controllers. Such redundant communication need not result in undesired accessory behavior, since both controllers would be providing the same instructions.

Process 600 can continue indefinitely. For example, after delegating a trigger, controller 502(2) can continue monitoring at block 610 for as long as the trigger remains enabled and delegated. In some embodiments, after resuming responsibility for executing a trigger, controller 502(2) can monitor the situation to determine whether coordinator 510 (or another potential delegate) becomes available again. If that happens, controller 502(2) can return to block 606 to determine whether to delegate the trigger.

In some embodiments, a user can enable and disable a trigger at any time, e.g., via a user interface. When a trigger that has been delegated becomes disabled, controller 502(2) can notify the delegate, e.g., via a message to the delegation service of the delegate or via synchronization of an updated trigger data object 520. In some embodiments, disabling a trigger can result in controller 502(2) revoking the delegation; when the trigger is re-enabled, controller 502(2) can make a new determination regarding whether to delegate the trigger. In other embodiments, controller 502(2) can instruct the delegate to implement any received enable or disable instructions without revoking the delegation.

It should be noted that delegation process 600 can be transparent to the user. The user can simply interact with controller 502(2) to define and enable a trigger. Controller 502(2) can determine whether (and to what device) to delegate execution of the trigger and can make and/or revoke a delegation without notifying the user. In some embodiments, controller 502(2) can notify the user of delegation decisions or request user confirmation, but this is optional. In some embodiments, a user may be able to view status information related to triggers, which may include an indication regarding whether (and to what device) the trigger is currently delegated.

Figure 7:
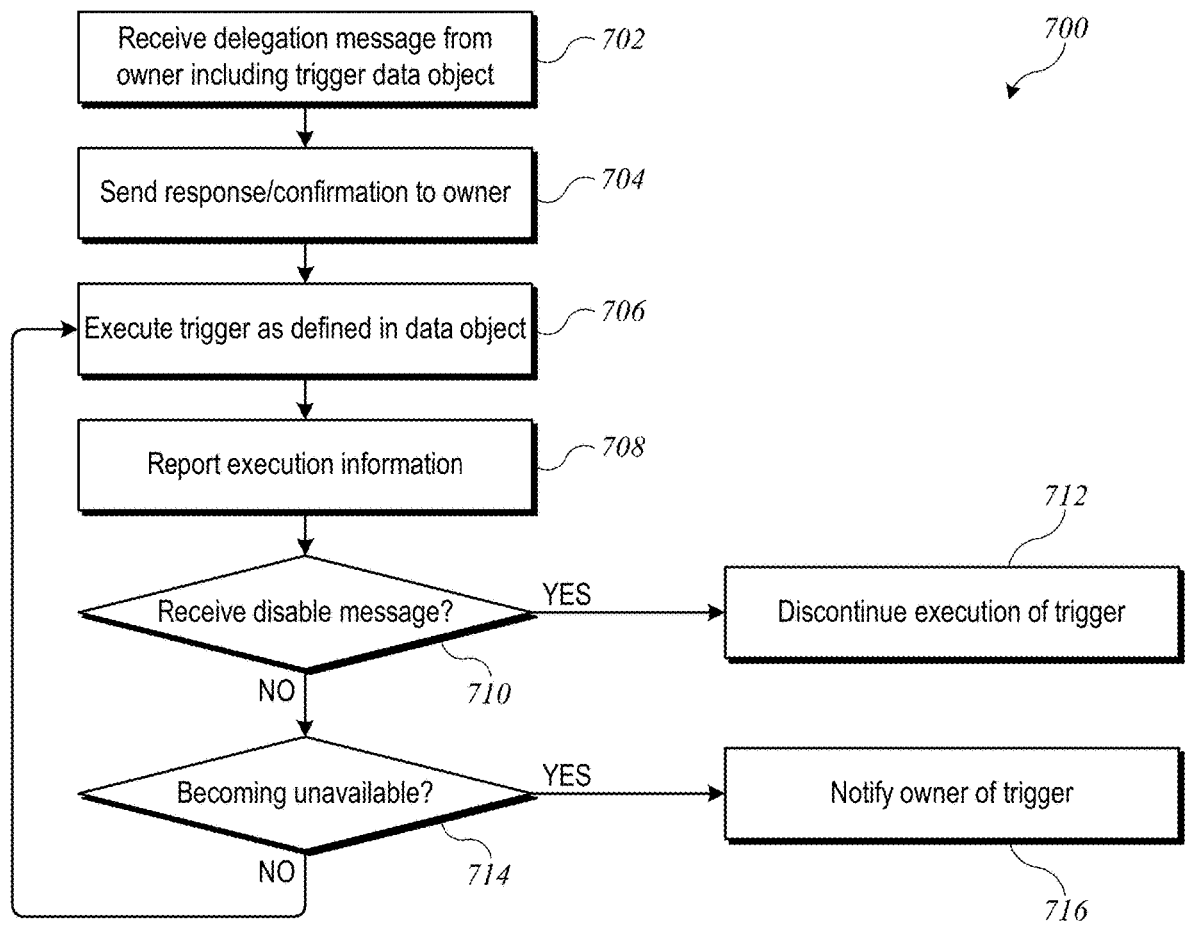
FIG. 7 shows a flow diagram of a process for executing a delegated trigger according to an embodiment of the present invention.

Coordinator 510 (or any other controller to which a trigger is delegated) can execute the delegated trigger. FIG. 7 shows a flow diagram of a process 700 for executing a delegated trigger according to an embodiment of the present invention. Process 700 can be executed, e.g., by coordinator 510) of FIG. 5 (or any other coordinator or controller to which a trigger is delegated) and can be implemented, e.g., using suitable program code executed by a processor.

Process 700 can begin at block 702, when coordinator 510 receives a delegation message from an owner of a trigger. For example, the delegation message can be the message sent by controller 502(2) (the owner of a trigger) at block 608 of process 600 described above. The delegation message can include a trigger data object (e.g., data object 520 described above). As described above, in some embodiments, coordinator 510 can implement a delegation service, and the delegation message can be received as a write request to the delegation service, and in some embodiments, coordinator 510 can receive updated trigger data object 520 via synchronization of the environment model and read updated trigger data object 520 to determine that it is now the delegate.

At block 704, coordinator 510 can send a confirmation message or other response to the owner of the trigger, confirming that coordinator 510 will take responsibility for execution of the trigger. In some embodiments, prior to sending the confirmation message, coordinator 510 can perform verification operations to confirm its ability to execute the trigger. For example, coordinator 510 can determine whether it is capable of detecting the triggering event. Capability of detecting the triggering event can depend on the specific event. For instance, if the triggering event is a state change in an accessory 504, coordinator 510 can communicate with accessory 504 to register for notifications of the relevant state change. If for some reason this is not possible, coordinator 510 can respond to the owner indicating that controller 510 cannot execute the trigger, and process 700 can end (not explicitly shown). As another example, coordinator 510 can determine whether it is capable of performing the resulting action(s), e.g., sending control messages to the relevant accessory (or accessories) 504. Again, if for some reason this is not possible, coordinator 510 can respond to the owner indicating that controller 510 cannot execute the trigger, and process 700 can end.

At block 706, coordinator 510 can begin to execute the trigger. This can be similar to execution of the trigger by controller 502(2) described above. For example, depending on the particular triggering event, coordinator 510 can register, or subscribe, to be notified of accessory state changes corresponding to the triggering event or activate other logic to detect the triggering event. When the triggering event is detected, coordinator 510 can proceed to test the triggering condition (which can be an "always" condition or other condition as described above) and, if the triggering condition is satisfied, execute the resulting action(s), e.g., by sending control messages to one or more accessories 504.

At block 708, coordinator 510 can report execution information, which can include any action that creates a record of execution of the trigger. For example, coordinator 510 can create an entry in an internal or cloud-based log file for local environment 506 indicating when the triggering event was detected, whether the triggering condition was detected in response to an occurrence of the triggering event, and that the resulting action set was performed (assuming the triggering condition was satisfied) or that an error occurred when attempting to perform the resulting action set (e.g., if an accessory either did not respond to a control message or responded with an error). In addition or instead, coordinator 510 can send reporting messages to the owner of the trigger (e.g., controller 502(2)) indicating when the triggering event was detected and whether any errors occurred in connection with performing the resulting action set. Additionally or instead, reporting messages can be sent to one or more other controllers 502 or other devices that have been designated by the user as devices that should receive reporting messages. For example, all of the user's devices may be designated to receive reporting messages, even if only one of those devices is the owner of the trigger, or one user's device(s) may receive reporting messages related to execution of triggers owned by a controller that belongs to a different user. In some embodiments, controller 502(2) (or other owner of a trigger) can use the receipt of reporting messages as part of monitoring the status of the coordinator at block 610 of process 600 described above.

Execution of the trigger and reporting of execution information can occur on an ongoing basis. Thus, once a trigger is delegated, the delegation can remain in effect indefinitely, and the device to which the trigger is delegated (e.g., coordinator 510) can perform multiple instances of detecting the triggering event, testing the triggering condition, and performing the resulting actions.

In some instances, it may be desirable to disable a trigger without revoking the delegation. For instance, at block 710, coordinator 510 can receive a disable message. In some embodiments, a disable message can be sent by the owner of the trigger, e.g., by writing an updated trigger data object 520 to the delegation service of coordinator 510 with Enabled field 528 set to "false." In some embodiments, the disable message can include the name 522 of trigger data object 520 and an instruction to change Enabled field 528 to false. Some implementations can allow any controller to disable a delegated trigger; in other implementations, only the owner of a delegated trigger can disable it. Accordingly, receiving a disable message at block 710 can include verifying that the source of the message is a controller that is permitted to disable the trigger in question. At block 712, in response to a disable message, coordinator 510 can discontinue execution of the trigger. For example, coordinator 510 can unsubscribe from accessory notifications that were being used to detect the triggering event; alternatively, coordinator 510 can continue to receive accessory notifications but not execute the ensuing activities of checking the triggering condition and performing the resulting action set.

Although not expressly shown in FIG. 7, a delegated trigger that has been disabled can be re-enabled at a later time. For instance, the owner (or another controller) can send an enable message, e.g., by posting an updated trigger object 520 to the delegation service of coordinator 510 or by updating trigger object 520 in an automatically synchronized environment model. In some embodiments, the enable message can include the name 522 of trigger data object 520 and an instruction to change Enabled field 528 to true. In response to an enable message, coordinator 510 can resume execution of the trigger at block 706 of process 700.

In some cases, coordinator 510 may become unavailable for execution of delegated triggers. For example, access to accessories may be controlled based on a user account, and coordinator 510 may have access only while an authorized user is logged in. If a user logs out, the logout process can include coordinator 510 determining at block 714 that it is becoming unavailable. Other circumstances, e.g., a power-down process executed by coordinator 510, can also result in such a determination. When coordinator 510 determines that it is becoming unavailable, it can notify the owner of a delegated trigger at block 716, e.g., using a mechanism similar to accessory status notifications described above. The notification can be received by the owner, e.g., as part of monitoring the status of the coordinator at block 610 of process 600. Sending a notification of unavailability can allow the owner to revoke the delegation of the trigger or take other action. It should be understood that there can also be circumstances under which coordinator 510 can become unavailable without sending a notification of the occurrence (e.g., if a power outage or other mishap occurs), and the owner of a trigger can detect such circumstances through various monitoring operations, e.g., as described above. As long as the owner of the trigger can detect that a delegate has become unavailable, the owner can take back the responsibility for executing the trigger.

In some instances, coordinator 510 may become unavailable and at a later time become available again. Depending on implementation, coordinator 510 can either automatically resume execution of delegated triggers upon becoming available again or wait for an instruction from the owner of the trigger (or another controller) to reinstate the delegation. Automatically resuming execution of delegated triggers may result in both the owner and coordinator 510 performing the same action set in response to the same occurrence of the triggering event; as noted above, such duplicated execution need not cause a problem for the user or the accessories.

Processes 600 and 700 are illustrative, and variations and modifications are possible. Blocks and operations described sequentially can be performed in parallel, order of operations can be varied, and operations can be combined, modified, added or omitted. Using processes 600 and 700, a controller (e.g., controller 502(2)) can delegate execution of a trigger to another controller (e.g., coordinator 510). The delegate takes responsibility for detecting the triggering event (and triggering condition where applicable) and for performing the associated action set when the triggering event is detected. Responsibility for execution of a delegated trigger can remain with the delegate until the delegation is expressly revoked. If the delegate becomes unavailable to execute the trigger, the owner can resume the responsibility either temporarily (e.g., by executing the trigger until such time as the delegate becomes available again) or permanently (e.g., by revoking the delegation).

In some embodiments, the decision whether to delegate the trigger (e.g., block 606 of process 600) can be revisited at any time. For example, if controller 502(2) initially determines that coordinator 510 is not available, controller 502(2) can execute the trigger as described above. If, at some later time, controller 502(2) detects that coordinator 510 has become available, controller 502(2) can re-execute portions of process 600 to delegate the trigger to coordinator 510.

Any number of triggers can be delegated to a given delegate device (e.g., coordinator 510). For example, referring to FIG. 5, controllers 502(1) and 502(2) can each delegate one or more triggers to coordinator 510. In some instances, it is possible that different triggers will conflict. For example, as noted above, an action set performed in response to a first triggering event may include an action that produces a triggering event for a second action set, performance of which may undo an effect of the first action set, or execution of the second action set may retrigger the first action set (potentially leading to a loop where two or more triggered action sets are performed repeatedly as each one triggers the next).

In some embodiments, a delegate device such as coordinator 510 can incorporate consistency checking logic (e.g., similar to the consistency checking logic described above). When a trigger is delegated to coordinator 510, coordinator 510 can apply the consistency checking logic to detect conflicts between the newly delegated trigger and any previously delegated triggers. If a conflict is detected, coordinator 510 can notify the controller (or other owner device) that delegated the trigger that created the conflict.

Figure 8:
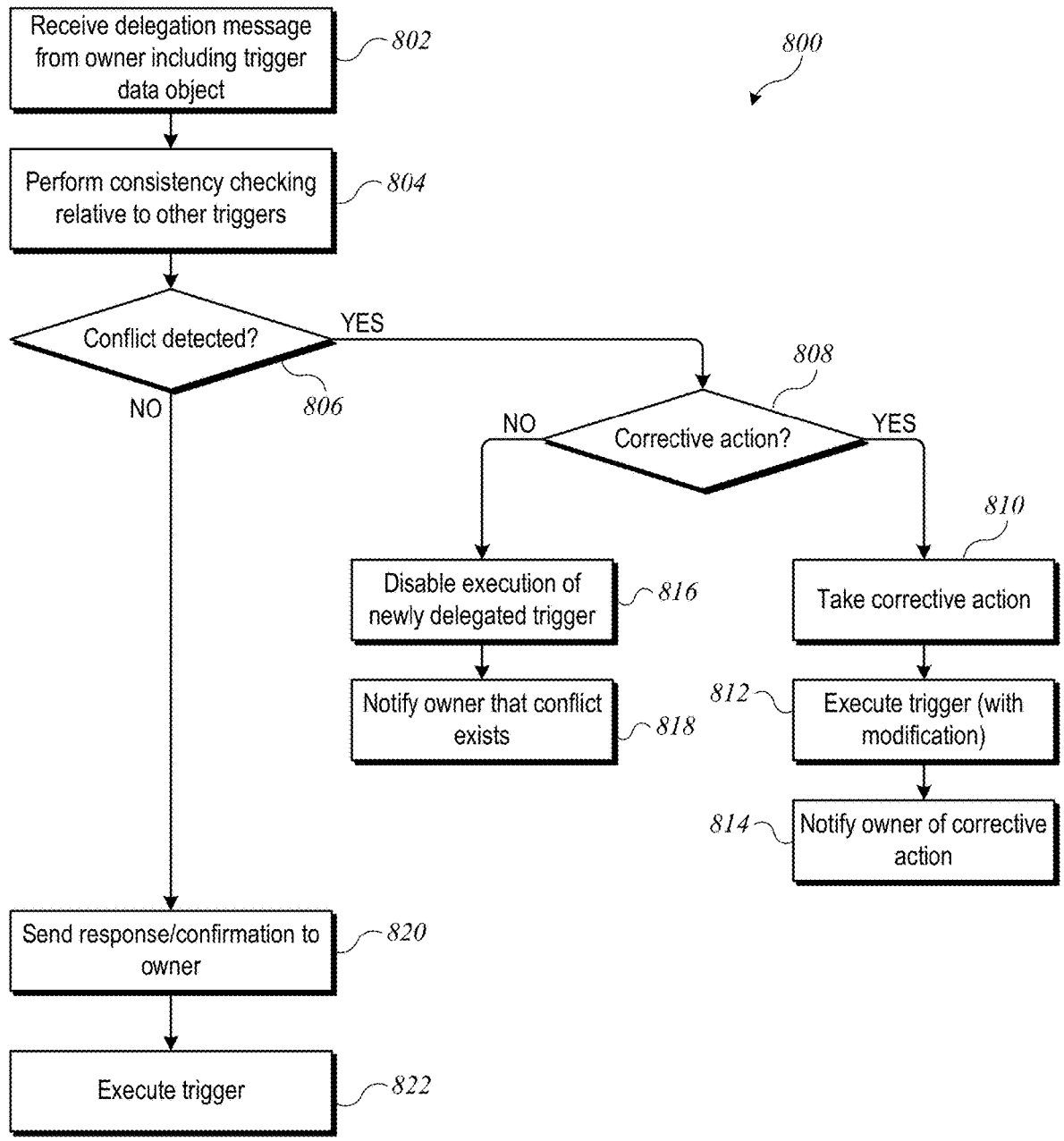
FIG. 8 shows a flow diagram of another process for executing a delegated trigger according to an embodiment of the present invention.

FIG. 8 shows a flow diagram of a process 800 for executing a delegated trigger according to an embodiment of the present invention that incorporates consistency checking logic. Process 800 can be executed, e.g., by coordinator 510 of FIG. 5 (or any other coordinator or controller) and can be implemented, e.g., using suitable program code executed by a processor. Some aspects of process 800 can be similar to process 700 of FIG. 7, and process 800 can be used in connection with a controller (or multiple controllers) executing process 600 described above.

Process 800 can begin at block 802, when coordinator 510 receives a delegation message from an owner of a trigger. This can be similar or identical to block 702 of process 700.

At block 804, process 800 can invoke consistency checking logic to detect conflicts between the newly delegated trigger and any other triggers that have already been delegated to coordinator 510. As described above, the consistency checking logic can detect inconsistencies (e.g., where two triggers have the same triggering event but inconsistent resulting actions) or loops (e.g., where execution of a first triggered action set results in satisfying the triggering condition for a second triggered action set that in turn results in triggering the first action set again). Other types of consistency checking logic can also be invoked.

If, at block 806, the consistency checking logic detects a conflict (e.g., an inconsistency or a loop), then at block 808, process 800 can determine whether a corrective action can be automatically taken by coordinator 510. For example, coordinator 510 can implement a rule that a new trigger supersedes any previously-defined triggers that conflict with the new trigger, a rule that a trigger owned by a user with admin privilege takes priority over a trigger owned by a non-admin user, or other conflict-resolution rules as desired. In the case of a loop, another example of an automated corrective action can include coordinator 510 breaking the loop. For example if a first trigger includes an action that triggers a second trigger that in turn triggers the first trigger, coordinator 510 can detect this and can determine not to re-execute the first trigger after executing the second trigger, thereby avoiding looping behavior. In some embodiments, coordinator 510 can also "merge" triggers that have the same triggering event and triggering condition if the resulting actions do not conflict. For example, if a first trigger is defined as "at 10 pm, if everyone is home, turn off the porch light and lock the front door" and a second trigger is defined as "at 10 pm, if everyone is home, close the garage door and lock the front door," these triggers can be merged. If, at block 808, a corrective action can be automatically taken, then at block 810, process 800 can take the corrective action. At block 812, process 800 can begin executing the trigger (which may be modified by the corrective action), similarly to trigger execution described above, and at block 814, process 800 can initiate a notification to the owner of the trigger (e.g., the owning device or the owning user) that a conflict was detected and corrective action was taken. The notification may include an indication of the specific corrective action that was taken. The user may choose to modify the trigger to resolve the conflict in a different manner.

If, at block 808, no corrective action can be automatically taken, then at block 816, process 800 can disable execution of the newly delegated trigger, and at block 818, process 800 can notify the owner of the trigger (e.g., the owning device or the owning user) that the trigger has been disabled due to a conflict. In some embodiments, the controller that receives the notification can provide a report to the user and prompt the user to take corrective action (e.g., modifying the definition of one or more triggers to resolve the conflict).

If, at block 806, the consistency checking logic does not detect a conflict, then at block 820, process 800 can send a confirmation message or other response to the owner, confirming that coordinator 510 will take responsibility for execution of the trigger, similarly to block 704 of process 700. Verification that coordinator 510 is able to execute the trigger can also be performed at this stage, similarly to process 700. At block 822, coordinator 510 can execute the trigger, similarly to process 700. In some embodiments, process 800 can also include other blocks of process 700 described above, such as reporting execution information, disabling the trigger in response to a disable message, notifying a controller of impending unavailability, and so on.

Process 800 is illustrative, and variations and modifications are possible. Blocks and operations described sequentially can be performed in parallel, order of operations may be varied, and operations can be combined, modified, added, or omitted. Coordinator 510 can perform consistency checking regardless of which controller is the owner of a particular trigger. Thus, for instance, if two users inadvertently define inconsistent triggers using different controllers, coordinator 510 can detect this and alert one or both of the users. In some embodiments, the controllers for an automated environment can be configured to delegate all triggers to coordinator 510, and this can facilitate detection and resolution of conflicting triggers.

Some embodiments can include multiple coordinators. For example, a coordinator device can be built into a device that is resident in a home such as a set-top box or the like for a TV that is capable of communicating via a network and streaming media content via the network; a wireless router such as a Wi-Fi base station, DSL or cable modem. In some embodiments, a coordinator can be any device that is resident (physically present) in the home and that has sufficient communication capability to perform operations described herein as being performed by a coordinator. A home may have multiple such devices, all of which can be operated as coordinators. For instance, a home with multiple TVs can have a set-top box for each TV, or a home may have multiple Wi-Fi base stations, some of which may be operated as Wi-Fi network extenders to support a home-wide Wi-Fi network. In some embodiments, different coordinators in a home can be implemented in devices of different types (e.g., set-top box, Wi-Fi base station, tablet computer, desktop or laptop computer, etc.). Depending on where they are located, different coordinators may have relatively stronger or weaker signals from a particular accessory. For example, a home might have one resident device in an upstairs bedroom and another in a downstairs family room. The upstairs resident device may be physically closer than the downstairs resident device to accessories located upstairs and may therefore have a stronger, more reliable wireless communication path to the upstairs accessories. Conversely, the downstairs resident device may be physically closer than the upstairs resident device to accessories located downstairs and may therefore have a stronger, more reliable wireless communication path to the downstairs accessories. It may be desirable to have a trigger executed by the resident device (or other coordinator or other controller) that has the most reliable connection to the relevant accessories.

Figure 9:
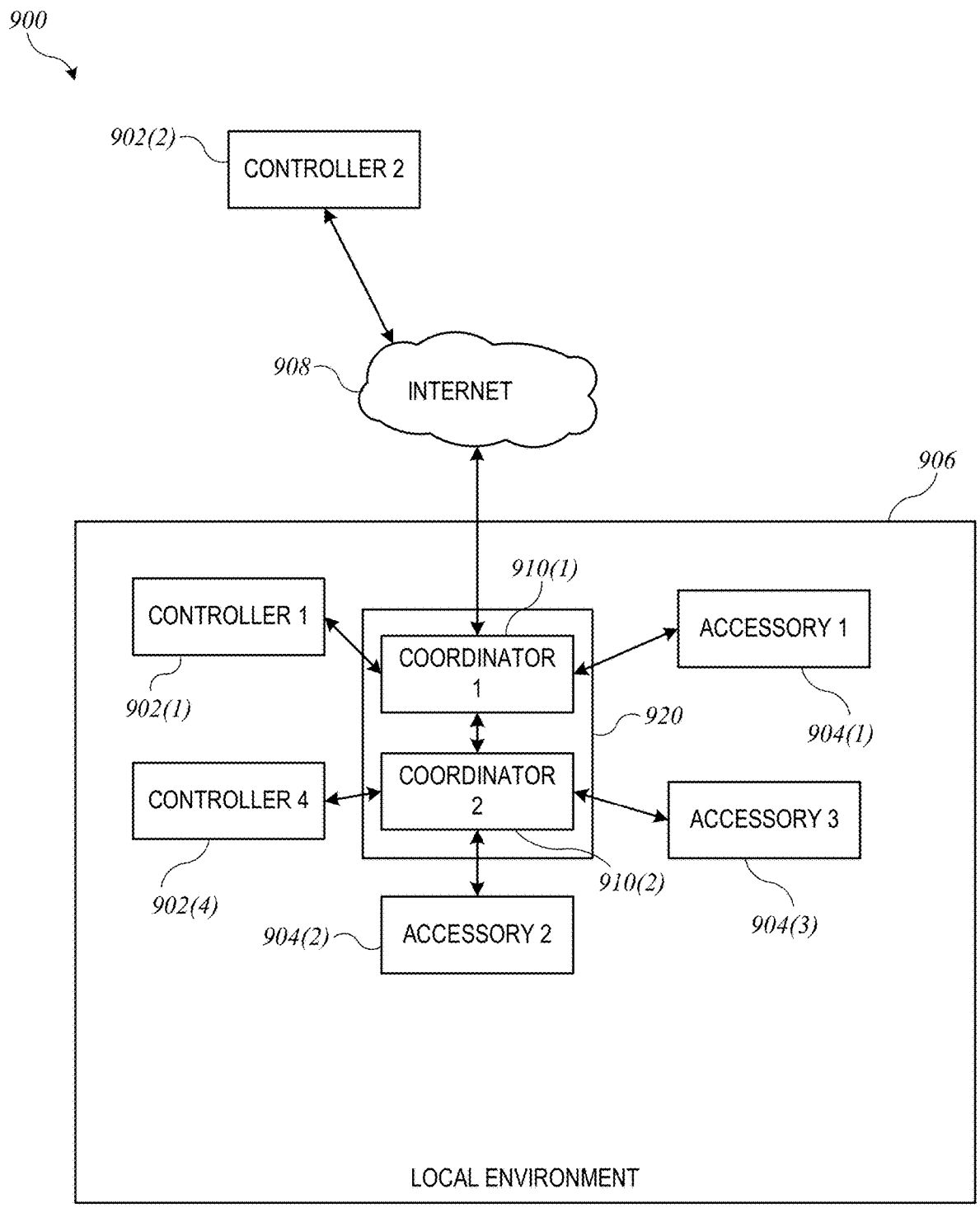
FIG. 9 shows a network configuration with two coordinators according to an embodiment of the present invention.

Accordingly, some embodiments can allow a coordinator (or other device to which a trigger is delegated) to re-delegate the trigger to another coordinator (or other device). FIG. 9 shows a network configuration 900 with two coordinators according to an embodiment of the present invention. Configuration 900 can be generally similar to network configuration 500 of FIG. 5 and/or to network configuration 200 of FIG. 2. Controllers 902 (which can be similar or identical to controllers 202 of FIG. 2) can communicate with accessories 904 (which can be similar or identical to accessories 204 of FIG. 2) located in local environment 906 (which can be similar or identical to local environment 206 of FIG. 2) via coordinators 910 (which can be similar or identical to coordinator 210 of FIG. 2). Coordinators 910(1), 910(2) can form a distributed environment management system 920.

Each controller 902 can have a designated coordinator 910 with which it preferentially communicates, and different controllers can have different designated coordinators. For example, controller 902(1) can have coordinator 910(1) as a designated coordinator while controller 902(3) has coordinator 910(2) as a designated coordinator. In some embodiments, each controller 902 that is present in local environment 906 can dynamically select a coordinator 910 when communication is desired, e.g., based on which coordinator 910 has the strongest received signal at the controller location. A controller that is outside local environment 906, such as controller 902(2), can communicate with its designated coordinator (which can be, e.g., coordinator 910(1)). In some embodiments, if the designated coordinator 910 is not available, a controller can fall back to another coordinator. Thus, depending on circumstances, either coordinator 910(1) or coordinator 910(2) can receive a delegation message from a controller 902, delegating a trigger to distributed environment management system 920.

In some instances with multiple coordinators, the coordinator that receives a particular trigger may not be the optimal device to execute the delegated trigger. For example, coordinator 910(1) may receive a delegation message delegating a trigger that includes actions to be performed on accessory 904(2). In the example shown, coordinator 910(2) has a direct communication path to accessory 904(2) while coordinator 910(1) can communicate with accessory 904(2) via coordinator 910(2). Accordingly, it may be more effective for coordinator 910(2) to execute the delegated trigger than for coordinator 910(1) to execute it. Certain embodiments of the present invention can provide for re-delegation of a trigger from one coordinator to another.

Figure 10:
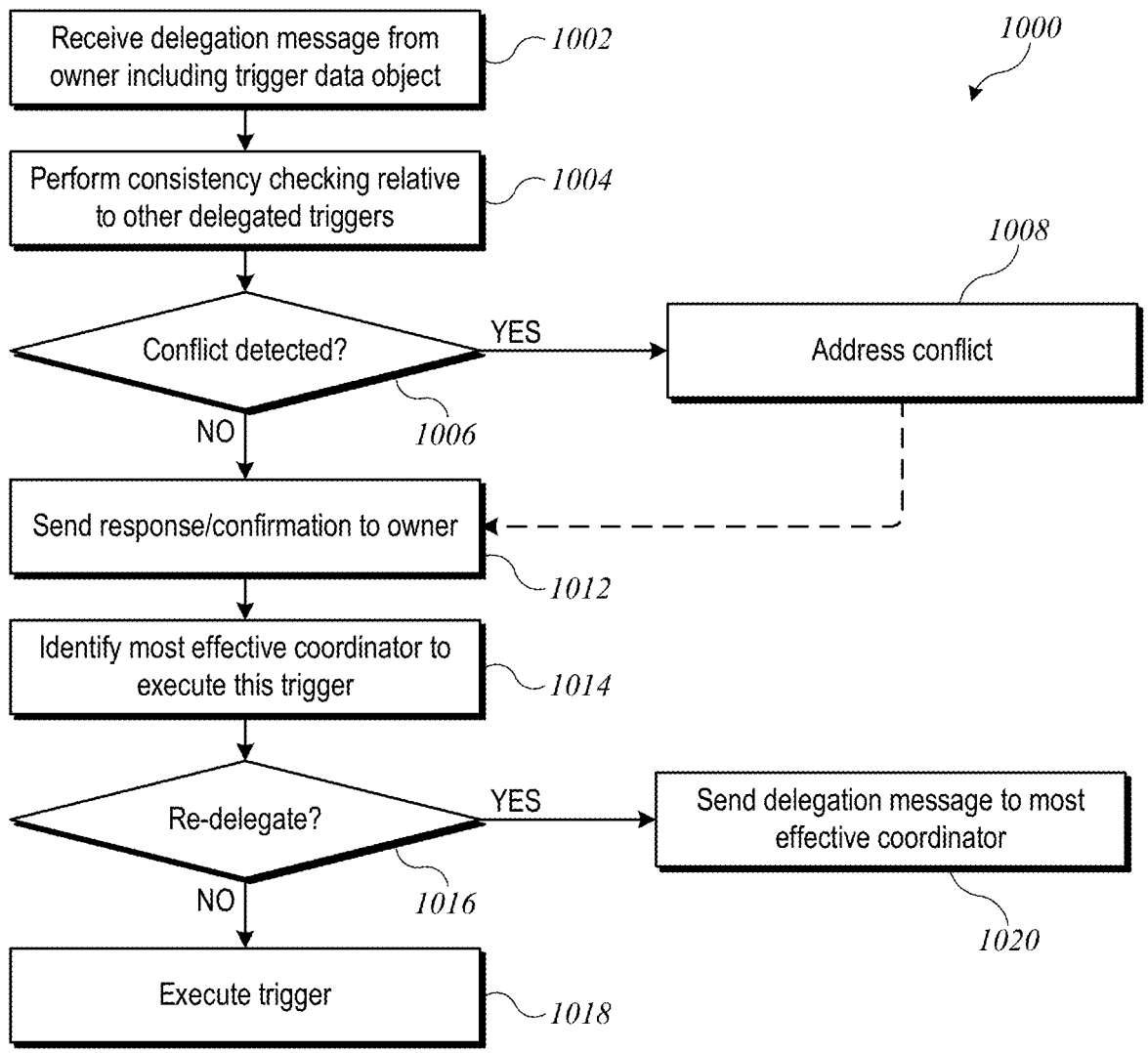
FIG. 10 shows a flow diagram of a process for re-delegating a delegated trigger according to an embodiment of the present invention.

FIG. 10 shows a flow diagram of a process 1000 for executing a delegated trigger according to an embodiment of the present invention that incorporates re-delegation. Process 1000 can be executed, e.g., by coordinator 910(1) (or coordinator 910(2)) of FIG. 9 (or any other device to which a trigger is delegated) and can be implemented, e.g., using suitable program code executed by a processor. Some aspects of process 1000 can be similar to process 700 of FIG. 7 and/or process 800 of FIG. 8, and process 1000 can be used in connection with a controller (or multiple controllers) executing process 600 described above.

Process 1000 can begin at block 1002, when coordinator 910(1) receives a delegation message from an owner of a trigger. This can be similar to block 702 of process 700.

At block 1004, process 1000 can invoke consistency checking logic to detect conflicts between the newly delegated trigger and any other triggers that have already been delegated to coordinator 910(1). This can be similar to block 804 of process 800.

If, at block 1006, the consistency checking logic detects a conflict (e.g., an inconsistency or a loop), then at block 1008, process 1000 can take action to address the conflict, similarly to blocks 808-818 of process 800 described above. In some instances, block 1008 can result in resolving the conflict, in which case process 1000 can continue (possibly with a modified trigger), and in some instances, block 1008 can result in process 1000 terminating.

If, at block 1006, the consistency checking logic does not detect a conflict, or if a conflict detected at block 1006 is resolved at block 1008, then at block 1012, process 1000 can send a confirmation message or other response to the owner, confirming that coordinator 910(1) will take responsibility for execution of the trigger, similarly to block 704 of process 700.

At block 1014, assuming that at least one other coordinator (or other potential delegate) is available, coordinator 910(1) can identify the most effective coordinator (or potential delegate) to execute the newly delegated trigger. For example, as described above, coordinator 910(1) can determine whether another coordinator, e.g., coordinator 910(2) has more direct access to the accessory (or accessories) involved in the trigger, including accessories that are sources of a triggering event as well as any accessories that are to be acted upon in response to the triggering event. In some embodiments, coordinator 910(1) can determine an "effectiveness" score for each coordinator (including itself), based on considerations such as the coordinator's ability to detect the triggering event and reliability or directness of the coordinator's communication channel to any accessories on which actions in the action set are to be performed, and the coordinator with the highest effectiveness score can be identified as "most effective." Other considerations can also be used, such as the likelihood of a particular coordinator remaining able to execute the trigger across time (e.g., a coordinator that is for some reason only intermittently powered up or connected to the local network may not be an effective delegate).

At block 1016, a determination whether to re-delegate the trigger can be made. For example, if coordinator 910(1) (the coordinator executing process 1000) is identified as most effective at block 1014, no re-delegation would occur. If any other coordinator is identified as most effective at block 1014, then the trigger can be re-delegated to that coordinator. If the determination is not to re-delegate the trigger, then at block 1018, coordinator 910(1) can execute the trigger, similarly to process 700 described above. In some embodiments, process 1000 can also include other blocks of process 700 described above, such as reporting execution information, disabling the trigger in response to a disable message, notifying a controller of impending unavailability, and so on.

If, at block 1014, the determination is to re-delegate the trigger, then at block 1020, coordinator 910(1) can send a delegation message to the coordinator identified as most effective (e.g., coordinator 910(2)). The delegation message can be similar to the message received at block 1002 and can identify the owner of the trigger. In some embodiments, coordinator 910(1) can wait for a confirmation response from coordinator 910(2), after which coordinator 910(2) can execute the trigger. In some embodiments, coordinator 910(1) can notify the owner of the trigger that the trigger has been re-delegated, so that the owner can monitor the correct delegate (e.g., at block 610 of process 600). In some embodiments, communication regarding re-delegation can be handled via updates to trigger data object 520 that are synchronized among coordinators 910 and other controllers 902.

From the perspective of coordinator 910(2), the delegation process can be similar or identical to process 700 or process 800 described above, except that the delegation message is received from another coordinator rather than the owner. As coordinator 910(2) executes the trigger, any report of execution information can be sent directly to the owner or via coordinator 910(1) as desired.

In some embodiments, coordinator 910(2) can perform its own consistency checking on a re-delegated trigger. In other embodiments, all coordinators 910 in a given local environment 906 can share information about triggers they are executing without delegating the trigger (e.g., via synchronization of an environment model that includes a trigger data object for each defined trigger associated with the environment), in which case consistency checking upon re-delegation may be omitted.

In some embodiments, re-delegation can be transparent to the owner. For instance, coordinator 910(1) can send a response at block 1012 prior to determining whether to re-delegate the trigger, and coordinator 910(1) need not (but can) inform the owner if re-delegation occurs. Further, execution reporting can be handled via coordinator 910(1) even if the trigger is re-delegated.

Process 1000 is illustrative, and variations and modifications are possible. Blocks and operations described sequentially can be performed in parallel, order of operations may be varied, and operations can be combined, modified, added, or omitted. Re-delegation can provide an enhanced ability to optimize trigger execution, as devices can negotiate among themselves to identify a most effective delegate for each trigger.

Synchronizing Trigger Data Objects Across Controllers

In the examples described above, it is assumed that a particular trigger is known to the owner (e.g., the controller device that initially defines the trigger) and to any delegate that takes responsibility for executing the trigger (e.g., coordinator 910(1) and/or 910(2) described above). Other devices (e.g., other controllers and/or coordinators that may interact with accessories in local environment 906) can be unaware of the existence of the trigger.

In some embodiments, trigger data objects (e.g., data object 520 of FIG. 5) can be synchronized among controllers and coordinators that have access to local environment 906. For instance, a trigger data object for each trigger that has been defined (regardless of which device initially defined it) can be included in an environment model that is synchronized among controllers and/or coordinators. Specific examples of local and cloud-based synchronization processes for an environment model are described in above-referenced application Ser. No. 14/725,912, and the synchronized environment model can include trigger data objects.

Figure 11A:
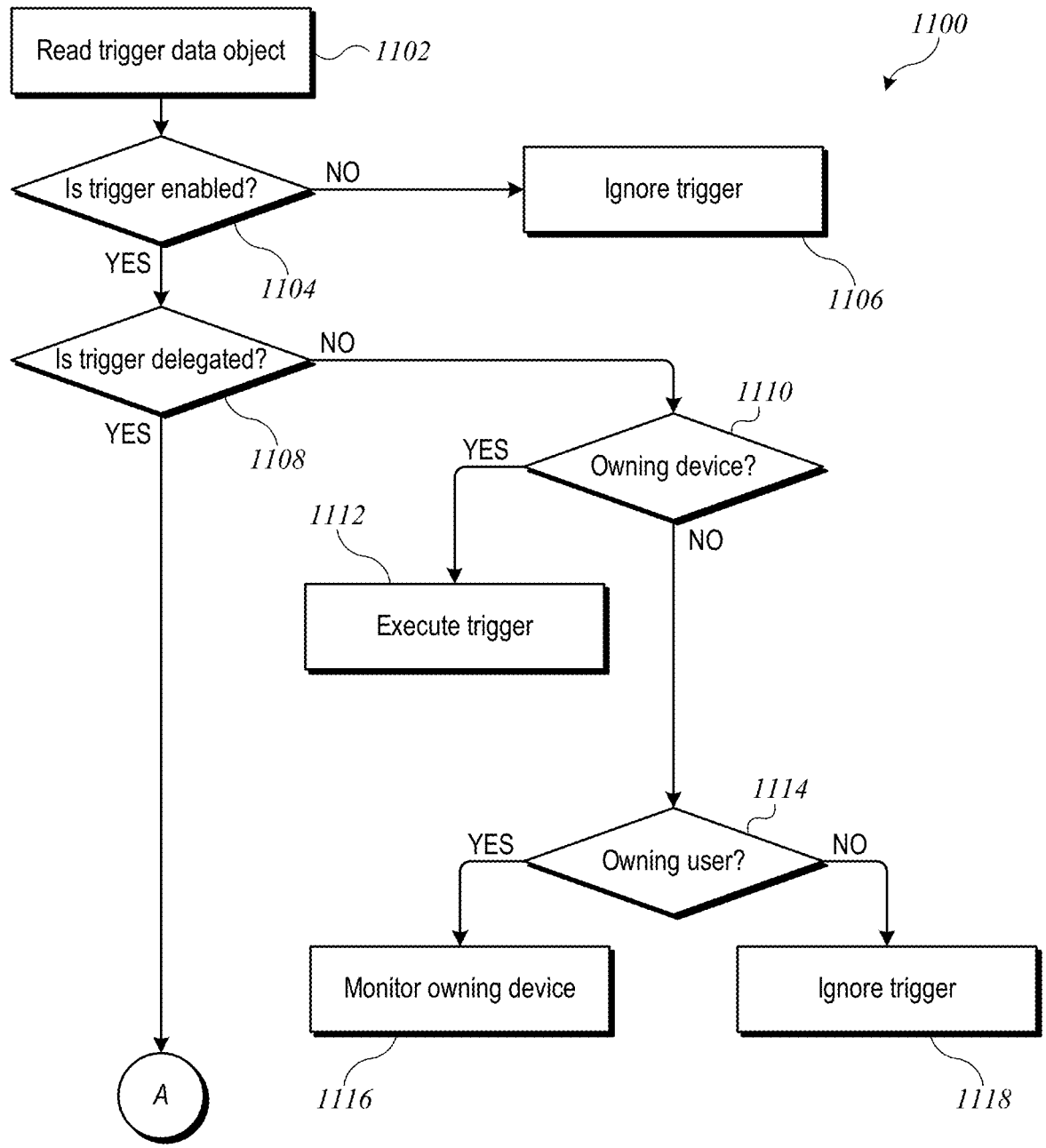
FIGS. 11A and 11B show a flow diagram of a process for determining whether to execute a trigger according to an embodiment of the present invention.
Figure 11B:
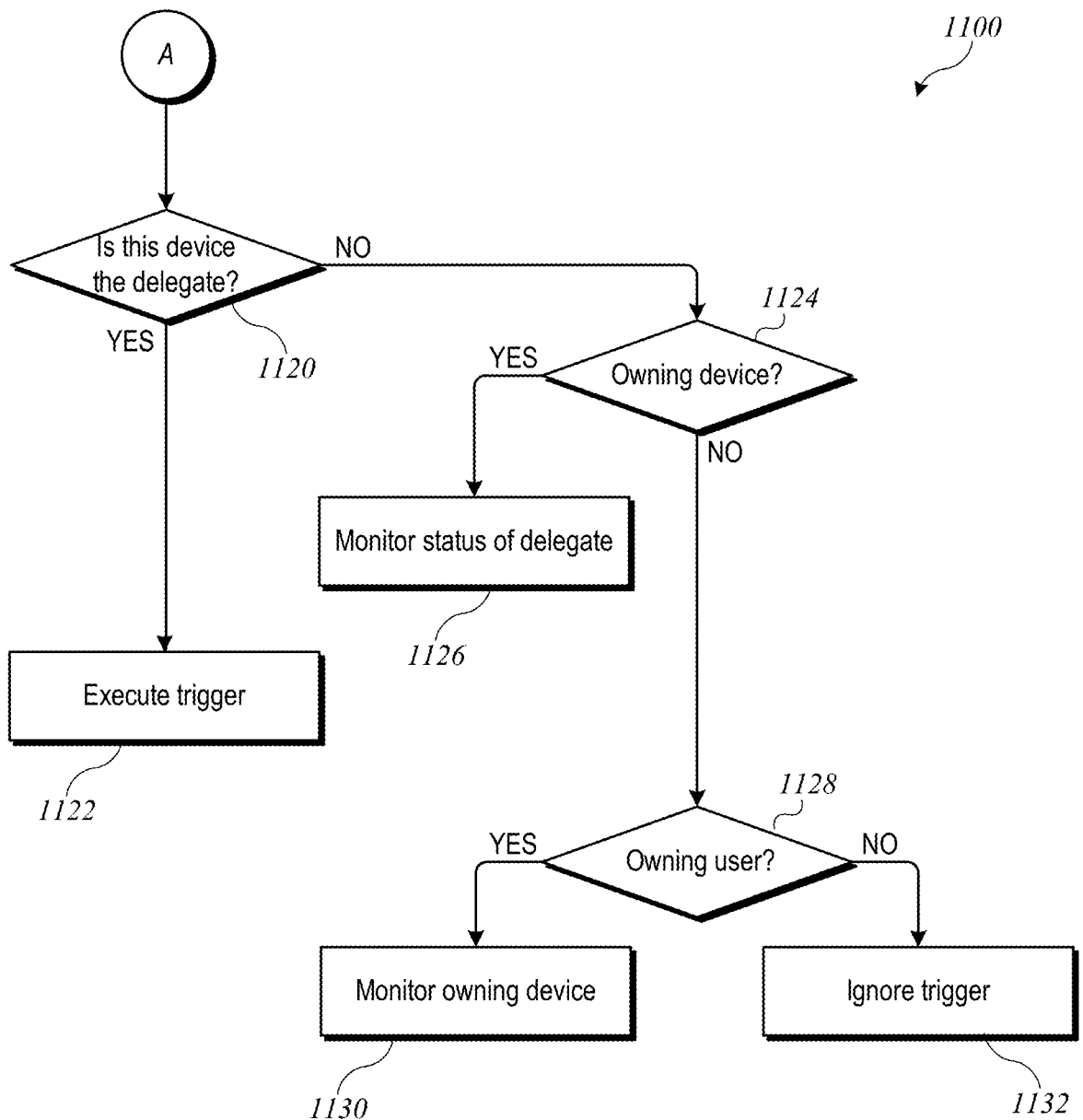

In embodiments where trigger data objects are synchronized among controllers and/or coordinators, a particular controller (or coordinator) need not execute all of the triggers represented in the environment model. Instead, the controller can read trigger data object 520 to determine whether it should execute the trigger. FIGS. 11A and 11B show a flow diagram of a process 1100 for determining whether to execute a trigger according to an embodiment of the present invention. Process 1100 can be executed, e.g., in any of the controller or coordinator devices described above and can be implemented, e.g., using suitable program code executed by a processor. It is assumed that each trigger data object associated with the environment has an owning device and an owning user as defined above. It is also assumed that each controller device "belongs to" a particular user; that is, at any given time, there is a specific user ID that is associated with the controller device.

Referring first to FIG. 11A, at block 1102, process 1100 can read a trigger data object (e.g., data object 520 of FIG. 5). Reading can occur whenever a trigger data object is added to the environment model and/or whenever a trigger data object in the environment model is updated. For instance, after synchronizing the environment model, a particular controller can determine whether the model includes any new or updated trigger data objects as a result of the synchronization. In some embodiments, reading of all trigger data objects can occur after a synchronization operation, regardless of whether a particular trigger data object has been changed. At block 1104, process 1100 can determine whether the trigger represented by the trigger data object is enabled (e.g., based on Enabled data field 528 of data object 520). If the trigger is not enabled, the trigger can be ignored at block 1106.

If the trigger is enabled, then at block 1108, process 1100 can determine whether the trigger is delegated, e.g., whether Delegated data field 530 has the value "true." If the trigger is not delegated, the trigger should be executed by its owner. In this example, it is preferred to have the owning device execute a non-delegated trigger, but if the owning device is not available, it may be desirable to have a "fallback" option in which the trigger can be executed by another device that belongs to the owning user. Accordingly, if at block 1108, the trigger is not delegated, then at block 1110, process 1100 can determine whether the device executing process 1100 is the owning device. For example, process 1100 can read Owner field 526 and determine whether the device identifier stored therein matches the device identifier of the device executing process 1100. If the device executing process 1100 is the owning device, then at block 1112, the device can execute the trigger. Execution of the trigger can be similar to process 700 described above. In some embodiments, execution can include related operations such as disabling the trigger in response to a disable message, notifying another controller of impending unavailability, and so on. (In this case the executing device is the owning device, and there may be no need to report execution information to the owner.) In some embodiments, execution information may be added to the environment model, e.g., by adding execution information to the trigger data object or to an activity log associated with the environment model.

If, at block 1110, the device executing process 1100 is not the owning device, then at block 1114, process 1100 can determine whether the device belongs to the owning user. For example process 1100 can read Owner field 526 and determine whether the user identifier stored therein matches the user identifier that is currently associated with the device executing process 1100. If the device executing process 1100 belongs to the owning user, then at block 1116, the device can monitor the owning device to determine whether the owning device is available and executing the trigger. If the owning device becomes unavailable, the device executing process 1100 can take over execution of the trigger (e.g., by updating fields 530 and 532 of data object 520 to identify itself as the delegate). If the device executing process 1100 is neither the owning device nor another device belonging to the owning user, then at block 1118, the device can ignore the trigger. In some embodiments, the trigger can be ignored until such time as a change in the trigger data object occurs, at which point process 1100 can be used again to process the change.

If, at block 1108, the trigger is delegated, then the delegate should execute the trigger and the owner should monitor the execution. Referring to FIG. 11B, at block 11120, process 1100 can determine whether this device (i.e., the device executing process 1100) is the delegate. For example, process 1100 can read DelegatedTo field 532 and determine whether the device identifier stored therein matches the device identifier of the device executing process 1100. If the device executing process 1100 is the delegate, then at block 1122, the device can execute the trigger. Execution of the trigger can be similar to process 700 described above. In some embodiments, execution can include related operations such as reporting execution information to the owner (e.g., the owning device as identified by Owner field 526), disabling the trigger in response to a disable message, notifying a controller of impending unavailability, and so on.

If, at block 1120, the device executing process 1100 is not the delegate, then at block 1124, process 1100 can determine whether this device is the owning device. For example, process 1100 can read Owner field 526 and determine whether the device identifier stored therein matches the device identifier of the device executing process 1100. If the device executing process 1100 is the owner, then at block 1126, the device can monitor the status of the delegate (e.g., as identified by DelegatedTo field 532). This can be similar to block 610 of process 600, and if the delegate becomes unavailable, the device executing process 1100 can assume responsibility for executing the trigger as described above.

If, at block 1124, the device executing process 1100 is not the owner (or the delegate), then at block 1128, process 1100 can determine whether the device belongs to the owning user. For example process 1100 can read Owner field 526 and determine whether the user identifier stored therein matches the user identifier that is currently associated with the device executing process 1100. If the device executing process 1100 belongs to the owning user, then at block 1130, the device can monitor the owning device to determine whether the owning device is available and operating to monitor the delegate. If the owning device becomes unavailable, the device executing process 1100 can take over monitoring of the delegate, which may lead to the device executing process 1100 taking over execution of the trigger if the delegate also becomes unavailable. The device executing block 1130 of process 1100 can take over execution of the trigger, e.g., e.g., by updating fields 530 and 532 of data object 520 to identify itself as the delegate. If the device executing process 1100 is neither the owning device nor another device belonging to the owning user, then at block 1132, the device can ignore the trigger. In some embodiments, the trigger can be ignored until such time as a change in the trigger data object occurs, at which point process 1100 can be used again to process the change.

Process 1100 allows execution of triggers to be managed such that, at any given time, only one controller (or coordinator) is responsible for executing a given trigger. For delegated triggers, the delegate assumes responsibility for executing the trigger and the owning device (or another device belonging to the owning user) can monitor the status of the delegate and assume responsibility for executing the trigger if a condition occurs indicating that the delegate may be unable to do so; all other devices can ignore the trigger. For non-delegated triggers, the owning device assumes responsibility for executing the trigger, and all other devices can ignore the trigger. It should be noted that different triggers can be delegated to different coordinators (or controllers), and there is no requirement that all triggers (or indeed any triggers) actually be delegated. The trigger data object can provide the information needed for each controller (or coordinator) to perform its assigned role (owner or delegate) if it has one and to ignore any trigger for which it does not have an assigned role.

Process 1100 provides a "fallback" chain to reduce the likelihood of an enabled trigger not being executed. As described, for a non-delegated trigger, the responsibility for execution is normally assumed by the owning device, but if the owning device becomes unavailable, another device belonging to the owning user can detect this condition and assume responsibility for executing the trigger. For a delegated trigger, the responsibility for execution is normally assumed by the delegate, but the owning device can monitor the delegate and assume responsibility if the delegate becomes unavailable. An additional fallback can be provided by having one or more other devices that belong to the owning user monitor the status of the owning device and assume responsibility for monitoring the delegate if the owning device becomes unavailable. (If both the owning device and the delegate become unavailable, the fallback device would detect unavailability of the owning device, then detect unavailability of the delegate and assume the responsibility for executing the trigger.) In some embodiments, additional levels of fallback can be provided. For example, as described above, one or more users can have admin privileges for the environment. In some embodiments, if none of the owning user's devices are available, an "admin controller" (which can be a controller that belongs to a user with admin privileges) can assume responsibility for executing those triggers. If no admin controller is available, some embodiments may provide that any available controller (or coordinator) can assume responsibility for executing enabled triggers when no device belonging to the owning user or an admin is available. A priority scheme can be defined to fall back to different devices, and providing one or more levels of fallback can increase the robustness of automated trigger execution. In some embodiments, regardless of ownership, all triggers defined for an environment are delegated to the coordinator for that environment whenever the coordinator is available, and an ownership-based fallback chain (e.g., similar to process 1100) may be provided to ensure that execution of triggers can continue when the coordinator becomes unavailable.

In some embodiments, trigger data objects, including the ownership and/or delegation fields, can be modified by any controller. If desired, restrictions can be placed on such modifications. For example, permission to modify the Owner field (including owning-user and/or owning-device identifiers) may be granted only to the current owner (e.g., the current owning user), allowing an owner of a trigger to "give" ownership to another controller (or user) but not allowing a non-owner to "take" ownership. As another example, permission to modify the delegation status and/or delegate identifier may be granted to the current owner and the current delegate, thereby allowing a delegate to re-delegate a trigger (e.g., in the manner described above). Other permissions for modifying a trigger data object can also be established. For instance, in some embodiments, only the owner can enable or disable a trigger. In other embodiments, any controller that has admin permissions for the environment model can enable or disable a trigger, regardless of ownership.

In addition, while examples described above assume that a controller owns a trigger and delegates execution of the trigger to a coordinator, this is not required. In some embodiments, any controller or coordinator can be the owner and/or the delegate for a particular trigger. For example, a user may have two controllers, such as a mobile phone and a tablet computer. If the user leaves the local environment carrying the phone and leaving the tablet behind, the phone can detect this occurrence and delegate any triggers it is responsible for executing to the tablet. When the phone returns to the local environment, the phone can revoke the delegation.

Further, where trigger data objects are synchronized across all controllers and coordinators that access a particular environment, consistency checking can be performed by the device that creates a trigger. For instance, during the process of defining the trigger, the device on which the trigger is being defined can read all trigger data objects associated with the environment model and perform consistency checking as described above. In the event of a conflict or other inconsistency, the device can alert the user and prompt the user to modify the definition or the device can propose a modification to resolve the conflict or inconsistency.

Example Devices

Embodiments described herein can be implemented in electronic devices that can be of generally conventional design. Such devices can be adapted to conform to a uniform accessory protocol that supports command-and-control operations by which a controller (a first electronic device) can control operation of an accessory (a second electronic device). In some instances, a device can combine features or aspects of a controller and an accessory, e.g., in the case of a coordinator or proxy as described above.

Figure 12:
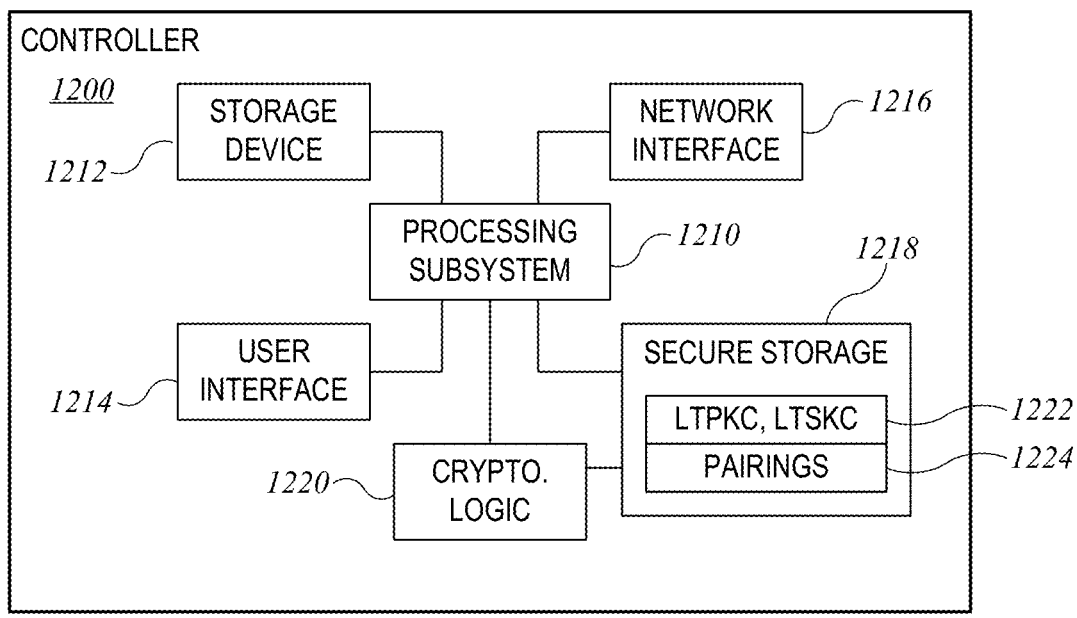
FIG. 12 shows a simplified block diagram of a controller according to an embodiment of the present invention.

FIG. 12 shows a simplified block diagram of a controller 1200 according to an embodiment of the present invention. Controller 1200 can implement any or all of the controller functions, behaviors, and capabilities described herein, as well as other functions, behaviors, and capabilities not expressly described. Controller 1200 can include processing subsystem 1210, storage device 1212, user interface 1214, communication interface 1216, secure storage module 1218, and cryptographic logic module 1220. Controller 1200 can also include other components (not explicitly shown) such as a battery, power controllers, and other components operable to provide various enhanced capabilities. In various embodiments, controller 1200 can be implemented in a desktop computer, laptop computer, tablet computer, smart phone, other mobile phone, wearable computing device, or other systems having any desired form factor. Further, as noted above, controller 1200 can be implemented partly in a base station and partly in a mobile unit that communicates with the base station and provides a user interface.

Storage device 1212 can be implemented, e.g., using disk, flash memory, or any other non-transitory storage medium, or a combination of media, and can include volatile and/or non-volatile media. In some embodiments, storage device 1212 can store one or more application and/or operating system programs to be executed by processing subsystem 1210, including programs to implement various operations described above as being performed by a controller. For example, storage device 1212 can store a uniform controller application that can read an accessory description record and generate a graphical user interface for controlling the accessory based on information therein (e.g., as described in above-referenced U.S. application Ser. No. 14/614,914). In some embodiments, portions (or all) of the controller functionality described herein can be implemented in operating system programs rather than applications. In some embodiments, storage device 1212 can also store apps designed for specific accessories or specific categories of accessories (e.g., an IP camera app to manage an IP camera accessory or a security app to interact with door lock accessories). Storage device 1212 can also store other data produced or used by controller 1200 in the course of its operations, including trigger data objects and/or other data pertaining to an environment model.

User interface 1214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1214 to invoke the functionality of controller 1200 and can view and/or hear output from controller 1200 via output devices of user interface 1214.

Processing subsystem 1210 can be implemented as one or more integrated circuits, e.g., one or more single-core or multi-core microprocessors or microcontrollers, examples of which are known in the art. In operation, processing system 1210 can control the operation of controller 1200. In various embodiments, processing subsystem 1210 can execute a variety of programs in response to program code and can maintain multiple concurrently executing programs or processes. At any given time, some or all of the program code to be executed can be resident in processing subsystem 1210 and/or in storage media such as storage device 1212.

Through suitable programming, processing subsystem 1210 can provide various functionality for controller 1200. For example, in some embodiments, processing subsystem 1210 can implement various processes (or portions thereof) described above as being implemented by a controller. Processing subsystem 1210 can also execute other programs to control other functions of controller 1200, including application programs that may be stored in storage device 1212. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 1216 can provide voice and/or data communication capability for controller 1200. In some embodiments communication interface 1216 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1216 can provide wired network connectivity (e.g., Ethernet) in addition to or instead of a wireless interface. Communication interface 1216 can be implemented using a combination of hardware (e.g., driver circuits, antennas, modulators/demodulators, encoders/decoders, and other analog and/or digital signal processing circuits) and software components. In some embodiments, communication interface 1216 can support multiple communication channels concurrently or at different times, using the same transport or different transports.

Secure storage module 1218 can be an integrated circuit or the like that can securely store cryptographic information for controller 1200. Examples of information that can be stored within secure storage module 1218 include the controller's long-term public and secret keys 1222 (LTPKC, LTSKC as described above), and a list of paired accessories 1224 (e.g., a lookup table that maps accessory ID to accessory long-term public key LTPKA for accessories that have completed a pair setup or pair add process as described above).

In some embodiments, cryptographic operations can be implemented in a cryptographic logic module 1220 that communicates with secure storage module 1218. Physically, cryptographic logic module 1220 can be implemented in the same integrated circuit with secure storage module 1218 or a different integrated circuit (e.g., a processor in processing subsystem 1210) as desired. Cryptographic logic module 1220 can include various logic circuits (fixed or programmable as desired) that implement or support cryptographic operations of controller 1200, including any or all cryptographic operations described above. Secure storage module 1218 and/or cryptographic logic module 1220 can appear as a "black box" to the rest of controller 1200. Thus, for instance, communication interface 1216 can receive a message in encrypted form that it cannot decrypt and can simply deliver the message to processing subsystem 1210. Processing subsystem 1210 may also be unable to decrypt the message, but it can recognize the message as encrypted and deliver it to cryptographic logic module 1220. Cryptographic logic module 1220 can decrypt the message (e.g., using information extracted from secure storage module 1218) and determine what information to return to processing subsystem 1210. As a result, certain information can be available only within secure storage module 1218 and cryptographic logic module 1220. If secure storage module 1218 and cryptographic logic module 1220 are implemented on a single integrated circuit that executes code only from an internal secure repository, this can make extraction of the information extremely difficult, which can provide a high degree of security. Other implementations are also possible.

Figure 13:
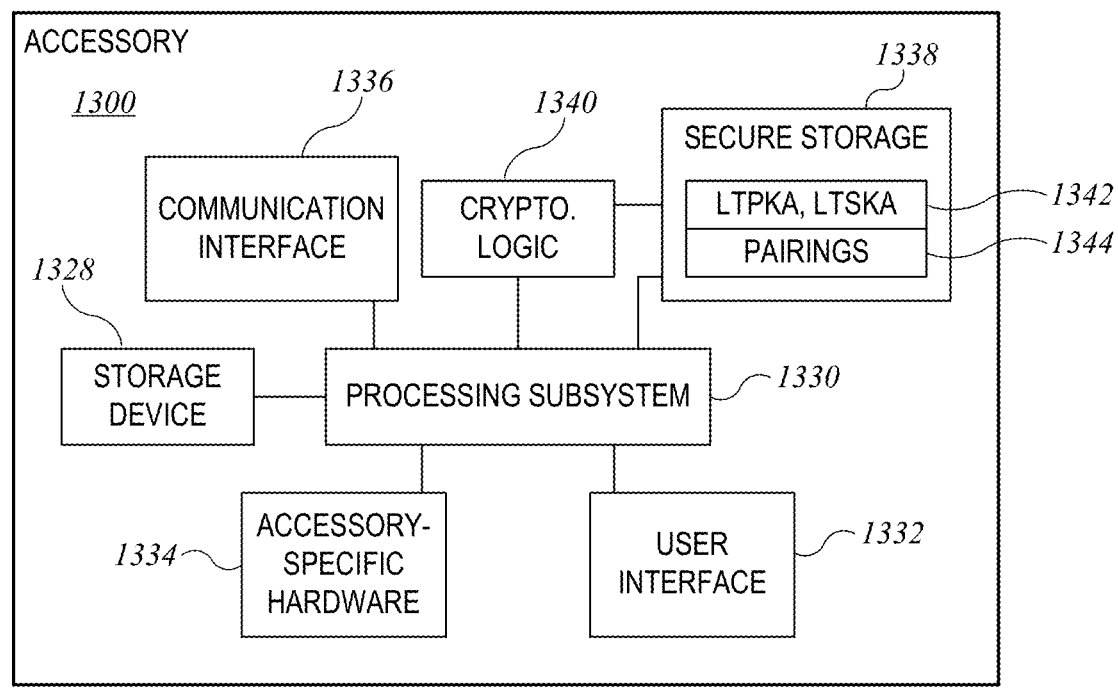
FIG. 13 shows a simplified block diagram of an accessory according to an embodiment of the present invention.

FIG. 13 shows a simplified block diagram of an accessory 1300 according to an embodiment of the present invention. Accessory 1300 can implement any or all of the accessory functions, behaviors, and capabilities described herein, as well as other functions, behaviors, and capabilities not expressly described. Accessory 1300 can include storage device 1328, processing subsystem 1330, user interface 1332, accessory-specific hardware 1334, communication interface 1336, secure storage module 1338, and cryptographic logic module 1340. Accessory 1300 can also include other components (not explicitly shown) such as a battery, power controllers, and other components operable to provide various enhanced capabilities.

Accessory 1300 is representative of a broad class of accessories that can be operated by a controller such as controller 1200, and such accessories can vary widely in capability, complexity, and form factor. Various accessories may include components not explicitly shown in FIG. 13, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1328 can be implemented, e.g., using disk, flash memory, or any other non-transitory storage medium, or a combination of media, and can include volatile and/or non-volatile media. In some embodiments, storage device 1328 can store one or more programs (e.g., firmware) to be executed by processing subsystem 1330, including programs to implement various operations described above as being performed by an accessory, as well as operations related to particular accessory behaviors. Storage device 1328 can also store an accessory object or accessory definition record that can be furnished to controller devices, e.g., during device discovery as described in above-referenced U.S. application Ser. No. 14/614,914. Storage device 1328 can also store accessory state information and any other data that may be used during operation of accessory 1300.

Processing subsystem 1330 can include, e.g., one or more single-core or multi-core microprocessors and/or microcontrollers executing program code to perform various functions associated with accessory 1300. For example, processing subsystem 1330 can implement various processes (or portions thereof) described above as being implemented by an accessory, e.g., by executing program code stored in storage device 1328. Processing subsystem 1330 can also execute other programs to control other functions of accessory 1300. In some instances programs executed by processing subsystem 1330 can interact with a controller (e.g., controller 1200), e.g., by generating messages to be sent to the controller and/or receiving messages from the controller.

User interface 1332 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 1300, a user can operate input devices of user interface 1332 to invoke functionality of accessory 1300 and can view and/or hear output from accessory 1300 via output devices of user interface 1332. Some accessories may provide a minimal user interface or no user interface, at all. Where the accessory does not have a user interface, a user can still interact with the accessory using a controller (e.g., controller 1200).

Accessory-specific hardware 1334 can include any other components that may be present in accessory 1300 to enable its functionality. For example, in various embodiments accessory-specific hardware 1334 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 1334 and that accessory-specific hardware can include mechanical as well as electrical or electronic components.

Communication interface 1336 can provide voice and/or data communication capability for accessory 1300. In some embodiments communication interface 1336 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1336 can provide wired network connectivity (e.g., Ethernet) in addition to or instead of a wireless interface. Communication interface 1336 can be implemented using a combination of hardware (e.g., driver circuits, antennas, modulators/demodulators, encoders/decoders, and other analog and/or digital signal processing circuits) and software components. In some embodiments, communication interface 1336 can support multiple communication channels concurrently or at different times, using the same transport or different transports.

Secure storage module 1338 can be an integrated circuit or the like that can securely store cryptographic information for accessory 1300. Examples of information that can be stored within secure storage module 1338 include the accessory's long-term public and secret keys 1342 (LTPKA, LTSKA as described above), and a list of paired controllers 1344 (e.g., a lookup table that maps controller ID to controller long-term public key LTPKC for controllers that have completed a pair setup or pair add process as described above). In some embodiments, secure storage module 1338 can be omitted; keys and lists of paired controllers can be stored in storage device 1328.

In some embodiments, cryptographic operations can be implemented in a cryptographic logic module 1340 that communicates with secure storage module 1338. Physically, cryptographic logic module 1340 can be implemented in the same integrated circuit with secure storage module 1338 or a different integrated circuit (e.g., a processor in processing subsystem 1330) as desired. Cryptographic logic module 1340 can include various logic circuits (fixed or programmable as desired) that implement or support cryptographic operations of accessory 1300, including any or all cryptographic operations described above. Secure storage module 1338 and/or cryptographic logic module 1340 can appear as a "black box" to the rest of accessory 1300. Thus, for instance, communication interface 1336 can receive a message in encrypted form that it cannot decrypt and can simply deliver the message to processing subsystem 1330. Processing subsystem 1330 may also be unable to decrypt the message, but it can recognize the message as encrypted and deliver it to cryptographic logic module 1340. Cryptographic logic module 1340 can decrypt the message (e.g., using information extracted from secure storage module 1338) and determine what information to return to processing subsystem 1330. As a result, certain information can be available only within secure storage module 1338 and cryptographic logic module 1340. If secure storage module 1338 and cryptographic logic module 1340 are implemented on a single integrated circuit that executes code only from an internal secure repository, this can make extraction of the information extremely difficult, which can provide a high degree of security. Other implementations are also possible.

Accessory 1300 can be any electronic apparatus that interacts with controller 1200. In some embodiments, controller 1200 can provide remote control over operations of accessory 1300 as described above. For example controller 1200 can provide a remote user interface for accessory 1300 that can include both input and output controls (e.g., a display screen to display current status information obtained from accessory 1300 and an input control such as a touchscreen overlay to allow changes to the status information). Controller 1200 in various embodiments can control any function of accessory 1300 and can also receive data from accessory 1300.

It will be appreciated that the system configurations and components described herein are illustrative and that variations and modifications are possible. It is to be understood that an implementation of controller 1200 can perform all operations described above as being performed by a controller and that an implementation of accessory 1300 can perform any or all operations described above as being performed by an accessory. A proxy, bridge, tunnel, or coordinator can combine components of controller 1200 and accessory 1300, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further Embodiments

While the invention has been described with respect to specific embodiments, one skilled in the art will recognize that numerous modifications are possible. Controller networks and/or accessory networks can include as many or as few devices as desired. Use of a proxy or coordinator is not required; regardless of the number of accessories or number of controllers, it is always possible (at least in principle) to establish pairings between each controller and each accessory and to have all controllers operate by controlling accessories directly. Where an accessory-network model (e.g., an environment model) is provided, each controller can obtain a copy of the model (e.g., via synchronization) and can provide access to the model through its user interface.

Further, where proxies or controllers are present, it can be but need not be the case that all controllers are permitted to access all accessories via the proxy or controller. Some controllers might be restricted from accessing accessories when not within the local environment, and some accessories might require that controllers access them directly rather than through a proxy or coordinator.

Some embodiments of the present invention can provide methods executable by a first electronic device, such as a controller, that defines a trigger. For instance, the first electronic device can define a trigger, the trigger specifying a triggering event and an action to be performed on an accessory device in response to detecting the triggering event, where the action is performable by sending a control message to the accessory device. The first electronic device can delegate the trigger to a second electronic device that is capable of communicating with the accessory device, e.g., by sending a delegation message to the second electronic device and/or by updating a trigger data object defining the trigger to indicate that the trigger is delegated to the second electronic device, where the trigger data object is part of an environment model that is shared among a set of controller devices that includes the first and second electronic devices. The delegation can be (but need not be) performed transparently to the user. Subsequently to delegating the trigger to the second electronic device, the first electronic device can monitor a status of the second electronic device to detect a condition indicating that the second electronic device is unavailable to execute the trigger. In response to detecting the condition, the first electronic device can execute the trigger; executing the trigger can include detecting the triggering event and sending the control message to the accessory device in response to detecting the triggering event. In some embodiments, in response to detecting the condition, the first electronic device can revoke the delegation of the trigger to the second electronic device.

Various conditions can be detected to indicate that the second electronic device is unavailable. For instance, the first electronic device can receive a notification from the second electronic device that the second electronic device is transitioning to a state of unavailability to execute the trigger. As another example, the first electronic device can send a message to the second electronic device and fail to receive an expected response to the message. As yet another example, the first electronic device can determine that an expected heartbeat signal from the second electronic device has not been received for at least a minimum time period.

Some embodiments of the present invention can provide methods executable by a first electronic device, such as a coordinator, that receives a delegated trigger. For instance, the first electronic device can receive a trigger data object created by a second electronic device, the trigger data object defining a trigger, the trigger including a triggering event and an action to be performed on an accessory device in response to detecting the triggering event, where the action is performable by sending a control message to the accessory device. Receiving the trigger data object can include receiving an indication that the trigger data object is delegated to the first electronic device. The first electronic device can perform consistency checking of the received trigger data object relative to one or more previously received trigger data objects to determine whether a conflict exists. In response to determining that a conflict exists, the first electronic device can send a notification to the second electronic device that the conflict exists, and in response to determining that a conflict does not exist, the first electronic device can execute the trigger. In some embodiments, in response to determining that a conflict exists, the first electronic device can determine whether a corrective action is available. In response to determining that a corrective action is available, the first electronic device can the corrective action, which can include modifying the trigger and then executing the modified trigger. In response to determining that a conflict exists for which a corrective action is not available, the first electronic device can disable execution of the trigger.

Various types of consistency checking can be performed. For example, the first electronic device can detect an inconsistency if the received trigger data object and one of the previously received trigger data objects have the same triggering event and conflicting actions to be performed. As another example, the first electronic device can detect a loop if received trigger and one or more previously received trigger data objects will trigger repeated execution of each other.

In some embodiments, the first electronic device, while it is executing a delegated trigger, can detect that it is about to transition to a state of unavailability to execute the trigger. When this occurs, the first electronic device can send a notification of unavailability to the second electronic device. If the first electronic device subsequently returns to a state of availability to execute the trigger, the first electronic device can resume execution of the trigger, e.g., in response to an indication from the second electronic device that the first electronic device should resume execution of the trigger.

Some embodiments of the present invention can provide methods executable by a first electronic device, such as a coordinator, that receives a delegated trigger. For instance, the first electronic device can receive a trigger data object created by a second electronic device, the trigger data object defining a trigger, the trigger including a triggering event and an action to be performed on an accessory device in response to detecting the triggering event, where the action is performable by sending a control message to the accessory device. Receiving the trigger data object can include receiving an indication that the trigger data object is delegated to the first electronic device. The first electronic device can identify a most effective device for executing the trigger, which can be either the first electronic device or a third electronic device. In response to determining that the third electronic device is the most effective device, the first electronic device can re-delegate the trigger to the third electronic device. In response to determining that the first electronic device is the most effective device, the first device can execute the trigger. If the trigger is re-delegated, the first electronic device can notify the second electronic device of the re-delegation.

Some embodiments of the present invention can provide methods executable by a first electronic device, such as a controller or coordinator, that can read trigger data objects associated with an environment. The first electronic device can read a trigger data object that defines a trigger, for instance, in response to performing a synchronization operation to update an environment model stored at the first device, where the environment model includes the trigger data object. The trigger defined by the trigger data object can include a triggering event and an action to be performed on an accessory device in response to detecting the triggering event, where the action is performable by sending a control message to the accessory device. The trigger data object can further specify an owner device, a delegation status, and a delegate device. In the event that the delegation status indicates that the trigger is delegated and the delegate device is the first electronic device, the first electronic device can executing the trigger, where executing the trigger includes detecting the triggering event and sending the control message to the accessory in response to detecting the triggering event. In the event that the delegation status indicates that the trigger is delegated, the delegate device is specified as a device other than the first electronic device, and the owner device is the first electronic device, the first electronic device can monitor a status of the delegate device to detect a condition indicating that the delegate device is unavailable to execute the trigger and executing the trigger in response to detecting the condition. In the event that the delegation status indicates that the trigger is not delegated and the owner device is the first electronic device, the first electronic device can execute the trigger.

In some embodiments, the environment model can include multiple trigger data objects. Where this is the case, the first electronic device can perform consistency checking of trigger data objects to determine whether a conflict exists. In response to determining that a conflict exists between two or more of the trigger data objects, the first electronic device can, for example, provide a notification to a user device. In some embodiments the first electronic device can attempt to take corrective action, e.g., as described above.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method executable by a first electronic device, the method comprising:
   receiving user input at the first electronic device;
   defining, by the first electronic device, a first electronic device triggered action set, the first electronic device triggered action set specifying a triggering event and an action to be performed by an accessory device in response to detecting the triggering event, wherein the action is performable by sending, by the first electronic device, a control message to the accessory device, and wherein defining the first electronic device triggered action set is performed in response to the user input being received at the first electronic device;
   providing, by the first electronic device, instructions for executing the first electronic device triggered action set to a second electronic device that is capable of communicating with the accessory device, wherein being capable of communicating with the accessory device comprises at least being configured to send, by the second electronic device, the control message to the accessory device;
   subsequent to providing the instructions for executing the first electronic device triggered action set to the second electronic device, monitoring, by the first electronic device, a status of the second electronic device to detect a condition indicating that the second electronic device is unavailable to execute the first electronic device triggered action set; and
   in response to detecting the condition:
   monitoring, by the first electronic device, for the triggering event; and
   sending, by the first electronic device, the control message to the accessory device in response to detecting the triggering event.

2. The method of claim 1 wherein providing the instructions for executing the first electronic device triggered action set includes sending a delegation message to the second electronic device.

3. The method of claim 1 wherein providing the instructions for executing the first electronic device triggered action set includes updating a triggered action set data object defining the triggered action set to indicate that the first electronic device triggered action set is delegated to the second electronic device, wherein the triggered action set data object is part of an environment model that is shared among a set of controller devices that includes the first electronic device and the second electronic device.

4. The method of claim 1 further comprising:
   in response to detecting the condition, revoking delegation of the first electronic device triggered action set to the second electronic device by providing second instructions to the second electronic device that indicate that the first electronic device will monitor for the triggering event.

5. The method of claim 1 wherein detecting the condition includes one or more of:
   receiving a notification from the second electronic device that the second electronic device is transitioning to a state of unavailability to execute the first electronic device triggered action set;
   sending a message to the second electronic device and failing to receive an expected response to the message; or
   determining that an expected heartbeat signal from the second electronic device has not been received for at least a minimum time period.

6. The method of claim 1 wherein providing the instructions for executing the first electronic device triggered action set to the second electronic device is performed transparently to a user.

7. An electronic device comprising:
   a communications interface; and
   a processor coupled to the communications interface, the processor being configured to:
   receive user input at the electronic device;
   define, by the electronic device, a triggered action set, the triggered action set specifying a triggering event and an action to be performed by an accessory device in response to detecting the triggering event, wherein the action is performable by sending, by the electronic device, a control message to the accessory device, and wherein defining the triggered action set is performed in response to the user input being received at the electronic device;

provide, by the electronic device, instructions for executing the triggered action set to a delegate device that is capable of communicating with the accessory device, wherein being capable of communicating with the accessory device comprises at least being configured to send, by the delegate device, the control message to the accessory device;

monitor, by the electronic device, subsequent to providing the instructions for executing the triggered action set to the delegate device, a status of the delegate device to detect a condition indicating that the delegate device is unavailable to execute the triggered action set; and in response to detecting the condition:
monitor, by the electronic device, the accessory device for the triggering event; and
sending, by the electronic device, the control message to the accessory device in response to detecting the triggering event.

8. The electronic device of claim 7 wherein the processor is further configured such that providing the instructions for executing the triggered action set includes sending a delegation message to the delegate device.

9. The electronic device of claim 7 wherein the processor is further configured such that providing the instructions for executing the triggered action set includes updating a trigger data object defining the triggered action set to indicate that the triggered action set is delegated to the delegate device, wherein the trigger data object is part of an environment model that is shared among a set of controller devices that includes the electronic device and the delegate device.

10. The electronic device of claim 7 wherein the processor is further configured to revoke delegation of the triggered action set to the delegate device in response to detecting the condition by providing second instructions to the delegate device that indicate that the electronic device will monitor for the triggering event.

11. The electronic device of claim 7 wherein the processor is further configured such that detecting the condition includes one or more of:
receiving a notification from the delegate device that the delegate device is transitioning to a state of unavailability to execute the triggered action set;
sending a message to the delegate device and failing to receive an expected response to the message; or
determining that an expected heartbeat signal from the delegate device has not been received for at least a minimum time period.

12. The electronic device of claim 7 wherein the processor is further configured such that providing the instructions for executing the triggered action set to the delegate device is performed transparently to the user.

13. The electronic device of claim 7 wherein the electronic device is a mobile device and the delegate device is a device that is resident in a local environment with the accessory device.

14. A non-transitory computer-readable storage medium having stored therein program code that, when executed by a processor in a first electronic device, cause the first electronic device to perform a method comprising:

receiving user input at the first electronic device;
defining, by the first electronic device, a triggered action set, the triggered action set specifying a triggering event and an action to be performed by an accessory device in response to detecting the triggering event, wherein the action is performable by sending, by the first electronic device, a control message to the accessory device, and wherein defining the triggered action set is performed in response to the user input being received at the first electronic device;

providing, by the first electronic device, instructions for executing the triggered action set to a second electronic device that is capable of communicating with the accessory device, wherein being capable of communicating with the accessory device comprises at least being configured to send, by the second electronic device, the control message to the accessory device;

subsequent to providing the instructions for executing the triggered action set to the second electronic device, monitoring, by the first electronic device, a status of the second electronic device to detect a condition indicating that the second electronic device is unavailable to execute the triggered action set;

in response to detecting the condition:
monitoring, by the first electronic device, the accessory device for the triggering event; and
sending, by the first electronic device, the control message to the accessory device in response to detecting the triggering event.

15. The non-transitory computer-readable storage medium of claim 14 wherein providing the instructions for executing the triggered action set includes sending a delegation message to the second electronic device.

16. The non-transitory computer-readable storage medium of claim 14 wherein providing the instructions for executing the triggered action set includes updating a trigger data object defining the triggered action set to indicate that the triggered action set is delegated to the second electronic device, wherein the trigger data object is part of an environment model that is shared among a set of controller devices that includes the first and second electronic devices.

17. The non-transitory computer-readable storage medium of claim 14 wherein the method further comprises:
in response to detecting the condition, revoking delegation of the triggered action set to the second electronic device.

18. The non-transitory computer-readable storage medium of claim 14 wherein detecting the condition includes one or more of:
receiving a notification from the second electronic device that the second electronic device is transitioning to a state of unavailability to execute the triggered action set;
sending a message to the second electronic device and failing to receive an expected response to the message; or
determining that an expected heartbeat signal from the second electronic device has not been received for at least a minimum time period.

19. The non-transitory computer-readable storage medium of claim 14 wherein providing the instructions for executing the triggered action set to the second electronic device is performed transparently to the user.

* * * * *

UNITED STATES PATENT AND TRADEMARK OFFICE
CERTIFICATE OF CORRECTION

PATENT NO. : 10,985,937 B2
APPLICATION NO. : 15/180046
DATED : April 20, 2021
INVENTOR(S) : Anush G. Nadathur, Kevin P. McLaughlin and Nathan E. Carroll Page 1 of 1

It is certified that error appears in the above-identified patent and that said Letters Patent is hereby corrected as shown below:

In the Specification
Column 20, Line 65, delete "column 402" and insert --name 402--.
Column 24, Line 51, delete "controller 510" and insert --coordinator 510--.
Column 24, Lines 57-58, delete "controller 510" and insert --coordinator 510--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*